US009825287B2

(12) United States Patent
Chen et al.

(10) Patent No.: US 9,825,287 B2
(45) Date of Patent: Nov. 21, 2017

(54) SURFACE MODIFICATION AGENTS FOR LITHIUM BATTERIES

(71) Applicant: UChicago Argonne, LLC, Chicago, IL (US)

(72) Inventors: Zonghai Chen, Bolingbrook, IL (US); Khalil Amine, Oakbrook, IL (US); Ilias Belharouak, Bolingbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 111 days.

(21) Appl. No.: 14/744,433

(22) Filed: Jun. 19, 2015

(65) Prior Publication Data

US 2015/0287987 A1 Oct. 8, 2015

Related U.S. Application Data

(63) Continuation of application No. 13/546,440, filed on Jul. 11, 2012, now Pat. No. 9,065,115, which is a continuation of application No. 13/397,319, filed on Feb. 15, 2012, now Pat. No. 8,292,974, which is a continuation of application No. 12/454,173, filed on May 13, 2009, now Pat. No. 8,187,746.

(60) Provisional application No. 61/127,901, filed on May 16, 2008.

(51) Int. Cl.
| | |
|---|---|
| *H01M 4/36* | (2006.01) |
| *H01M 4/62* | (2006.01) |
| *H01M 4/60* | (2006.01) |
| *H01M 4/13* | (2010.01) |
| *H01M 4/485* | (2010.01) |
| *H01M 4/04* | (2006.01) |
| *H01M 4/139* | (2010.01) |
| *H01M 10/052* | (2010.01) |
| *H01M 10/0567* | (2010.01) |
| *H01M 4/131* | (2010.01) |
| *H01M 4/1391* | (2010.01) |
| *H01M 4/505* | (2010.01) |
| *H01M 10/0525* | (2010.01) |

(52) U.S. Cl.
CPC ......... *H01M 4/366* (2013.01); *H01M 4/0416* (2013.01); *H01M 4/0421* (2013.01); *H01M 4/13* (2013.01); *H01M 4/139* (2013.01); *H01M 4/485* (2013.01); *H01M 4/604* (2013.01); *H01M 4/62* (2013.01); *H01M 4/623* (2013.01); *H01M 4/625* (2013.01); *H01M 10/052* (2013.01); *H01M 10/0567* (2013.01); *H01M 4/131* (2013.01); *H01M 4/1391* (2013.01); *H01M 4/505* (2013.01); *H01M 10/0525* (2013.01); *Y02E 60/122* (2013.01); *Y02P 70/54* (2015.11); *Y02T 10/7011* (2013.01); *Y10T 29/49115* (2015.01)

(58) Field of Classification Search
CPC ........... H01M 10/052; H01M 10/0525; H01M 10/0567; H01M 4/0416; H01M 4/0421; H01M 4/13; H01M 4/131; H01M 4/139; H01M 4/1391; H01M 4/366; H01M 4/485; H01M 4/505; H01M 4/604; H01M 4/62; H01M 4/623; H01M 4/625
See application file for complete search history.

(56) References Cited

U.S. PATENT DOCUMENTS

| | | | |
|---|---|---|---|
| 4,804,592 A | 2/1989 | Vanderborgh et al. | |
| 4,857,423 A | 8/1989 | Abraham et al. | |
| 5,340,670 A | 8/1994 | Takami et al. | |
| 5,595,842 A * | 1/1997 | Nakane | H01M 4/525 429/223 |
| 5,601,948 A | 2/1997 | Binder et al. | |
| 5,895,732 A | 4/1999 | Clough | |
| 6,228,531 B1 * | 5/2001 | Kolb | H01M 4/131 29/623.5 |
| 6,677,082 B2 | 1/2004 | Thackeray et al. | |
| 6,858,351 B2 | 2/2005 | Miura et al. | |
| 7,105,254 B2 | 9/2006 | Oyama | |
| 7,235,331 B2 | 6/2007 | Noda et al. | |
| 7,507,503 B2 | 3/2009 | Amine et al. | |
| 7,648,801 B2 | 1/2010 | Dahn et al. | |
| 7,748,497 B2 | 7/2010 | Tolliver et al. | |
| 7,785,740 B2 | 8/2010 | Amine et al. | |
| 7,811,710 B2 | 10/2010 | Dahn et al. | |
| 7,851,092 B2 | 12/2010 | Amine et al. | |
| 7,923,149 B2 | 4/2011 | Hwang et al. | |
| 7,968,235 B2 | 6/2011 | Amine et al. | |
| 2001/0012586 A1 | 8/2001 | Hong et al. | |
| 2003/0157409 A1 | 8/2003 | Huang | |
| 2005/0221168 A1 | 10/2005 | Dahn et al. | |
| 2005/0221196 A1 | 10/2005 | Dahn et al. | |

(Continued)

FOREIGN PATENT DOCUMENTS

| | | | | |
|---|---|---|---|---|
| JP | 2003-272619 | * | 9/2003 | ............. H01M 4/58 |
| KR | 1020000022943 | | 4/2000 | |

(Continued)

OTHER PUBLICATIONS

Z. Chen, Q. Wang, K. Amine. Improving the performance of soft carbon for lithium-ion batteries, Electrochimica Acta 51 (2006) 3890-3894.*
G. Schroeder, B. Gierczyk, D. Waszak, M. Walkowiak.Impact of ethyl tris-2-methoxyethoxy silane on the passivation of graphite electrode in Li-ion cells with PC-based electrolyte, Electrochem. Comm. 8 (2006) 1583-1587.*
Chen, Z. et al., "Improving the Performance of Soft Carbon for Lithium-Ion Batteries," Electrochimica Acta , 51, 2006, pp. 3890-3894.
Final Office Action from U.S. Appl. No. 12/454,173, dated Dec. 6, 2011 (16 pages).
International Preliminary Report on Patentability and Written Opinion from PCT/US2007/084481, dated Jun. 25, 2009 (13 pages).
Non-Final Office Action from U.S. Appl. No. 12/454,173, dated Aug. 19, 2011 (21 pages).
Non-Final Office Action in U.S. Appl. No. 13/546,440 dated Sep. 18, 2012 (10 pages).
J. March, Advanced Organic Chemistry, 4th Ed., 1992, p. 357.
Non-Final Office Action in U.S. Appl. No. 12/454,173 dated Aug. 19, 2011 (21 pages).

(Continued)

*Primary Examiner* — Carlos Barcena
(74) *Attorney, Agent, or Firm* — Foley & Lardner LLP

(57) ABSTRACT

An active material for an electrochemical device wherein a surface of the active material is modified by a surface modification agent, wherein the surface modification agent is an organometallic compound.

11 Claims, 1 Drawing Sheet

(56) References Cited

U.S. PATENT DOCUMENTS

| | | |
|---|---|---|
| 2005/0227143 A1 | 10/2005 | Amine et al. |
| 2006/0147809 A1 | 7/2006 | Amine et al. |
| 2006/0199080 A1 | 9/2006 | Amine et al. |
| 2007/0072085 A1 | 3/2007 | Chen et al. |
| 2007/0148545 A1 | 6/2007 | Amine et al. |
| 2007/0178370 A1 | 8/2007 | Amine et al. |
| 2007/0231700 A1* | 10/2007 | Watanabe ............. H01M 2/145 429/246 |
| 2007/0235259 A1 | 10/2007 | Tolliver et al. |
| 2008/0118836 A1* | 5/2008 | Hwang ................. H01M 4/621 429/219 |

FOREIGN PATENT DOCUMENTS

| | | |
|---|---|---|
| KR | 1020060116852 | 11/2006 |
| WO | WO-2005/083828 A1 | 9/2005 |
| WO | WO-2006/065605 | 6/2006 |
| WO | WO-2008/126968 | 10/2008 |

OTHER PUBLICATIONS

Notice of Allowance issued in U.S. Appl. No. 12/454,173 and dated Mar. 20, 2012 (7 pages).

Notice of Allowance issued in U.S. Appl. No. 13/397,319 dated Jun. 21, 2012 (13 pages).

Notice of Allowance issued in U.S. Appl. No. 13/546,440 dated Feb. 17, 2015 (10 pages).

Schroeder, G. et al., "Impact of ethyl tris-2-methoxyethoxy silane on the passivation of graphite electrode in Li-ion cells with PC-based electrolyte," Electrochem. Comm., 8 (2006) pp. 1583-1587.

Final Office Action in U.S. Appl. No. 13/546,440 dated Jan. 17, 2013 (32 pages).

Non-Final Office Action in U.S. Appl. No. 13/546,440 dated Jan. 5, 2015 (7 pages).

* cited by examiner

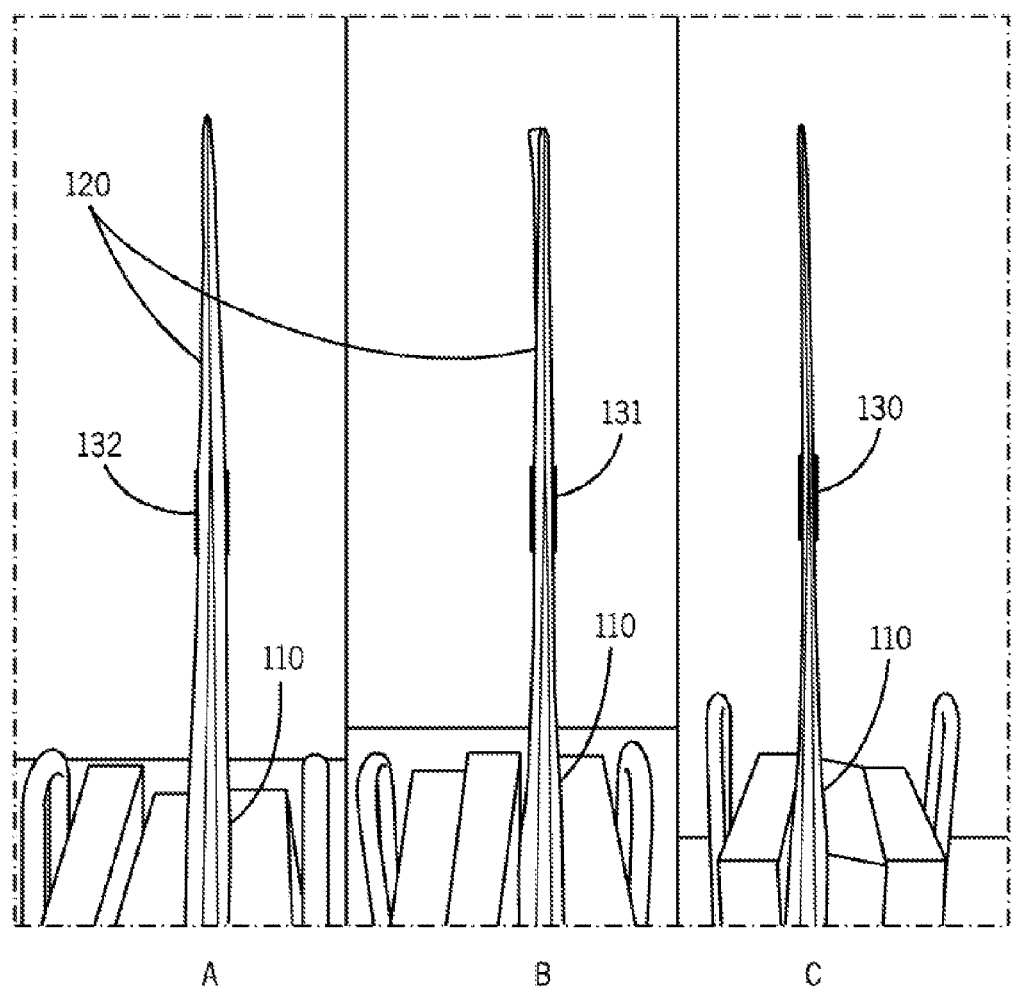

SURFACE MODIFICATION AGENTS FOR LITHIUM BATTERIES

CROSS-REFERENCE TO RELATED APPLICATIONS

This application is a continuation of U.S. patent application Ser. No. 13/546,440, filed on Jul. 11, 2012, now U.S. Pat. No. 9,065,115, which is a continuation of U.S. patent application Ser. No. 13/397,319, filed on Feb. 15, 2012, now U.S. Pat. No. 8,292,974, which is a continuation of U.S. patent application Ser. No. 12/454,173, filed on May 13, 2009, now U.S. Pat. No. 8,187,746, which in turn claims the benefit of U.S. Provisional Application No. 61/127,901, filed May 16, 2008, all of which are incorporated herein by reference, in their entireties, for any and all purposes.

GOVERNMENT RIGHTS

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD

The present invention generally relates to lithium rechargeable batteries. More particularly, surface modification agents for electrodes are described.

BACKGROUND

There has been growing interest in developing safe, high-power lithium ion batteries for transportation applications, such as hybrid electric vehicles (HEV) and plug-in hybrid electric vehicles (PHEV). Among the available portable energy storage solutions, lithium ion batteries have the highest energy density, and as a result, lithium ion batteries are a likely candidate for use in transportation applications. Yet, there are technical barriers for using lithium ion batteries in such applications.

Technological barriers related to the use of lithium ion batteries, include power capability concerns. As batteries decrease in size and cost, the power capability of the batteries must remain high. In other words, for a battery to find application as a transportation power source, the battery needs to exhibit a enough power capability to power the vehicles or accept energy from braking vehicles.

A certain amount of gas is generated inside a battery due to the interfacial reactions inside a lithium ion battery, such as formation of solid electrolyte interphases (SEI) during formation or decomposition of old SEI layers at elevated temperatures. The generation of gas may lead to a slow degradation of electrode materials, or a reduction in the active electrochemical surface area (i.e., an increase in impedance) by blocking the charge/ion transport pathways. When gas accumulates in a battery cell, the power capability of the cell is then concomitantly deteriorated. Nano-structured $Li_4Ti_5O_{12}$ can be a safe negative electrode material with high power capability and capacity retention. However, significant amount of gas is observed at elevated temperatures when nano-structured $Li_4Ti_5O_4$ was used against lithium manganese oxide spinels.

SUMMARY

In one aspect, an active material for an electrochemical device having a surface modification agent is provided. In some embodiments, the surface modification agent is a silane, organometallic compound, or a mixture of two or more thereof.

In other embodiments, the surface modification agent is a silane, and the silane has Formula I, II, III, IV, or a mixture of any two or more thereof:

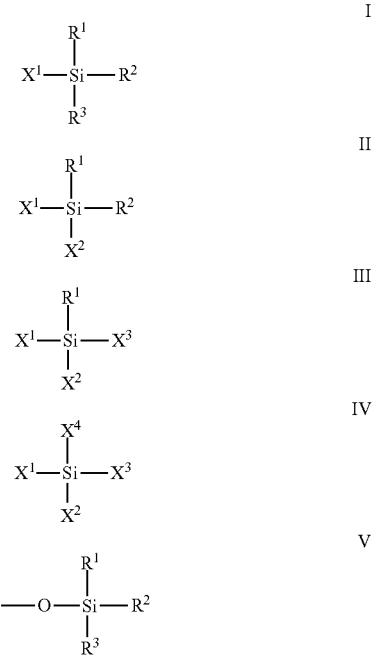

wherein:

$X^1$, $X^2$, $X^3$ and $X^4$ are independently —Cl, —Br or alkoxyl groups;

$R^1$, $R^2$, and $R^3$ are independently a halogen, a substituted or unsubstituted alkyl group, a substituted or unsubstituted aryl group, an $OR^5$ group, or a group of Formula V; and $R^5$ is a substituted or unsubstituted alkyl group, or a substituted or unsubstituted aryl group. In some such embodiments, at least one of substitution groups $R^1$, $R^2$, and $R^3$ is a substituted alkyl group that is an ethylene oxide moiety of Formula VI:

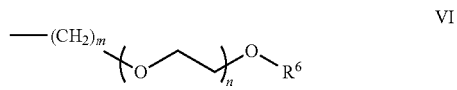

wherein:

m is an integer from 0 to 10;

n is an integer from 1 to 10; and $R^6$ is a substituted or unsubstituted alkyl group, a substituted or unsubstituted aryl group, or a carbonate-based sub group of Formula VII:

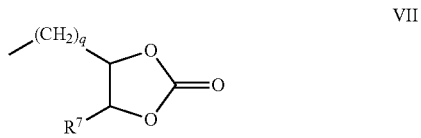

wherein
R⁷ is hydrogen, a substituted or unsubstituted alkyl group having from 1 to 12 carbon atoms; a substituted or unsubstituted alkenyl group having from 2 to 8 carbon atoms; and
q is an integer from 0 to 8.

In other embodiments, the surface modification agent is a metal alkoxide, a metal halide, a metal alkyl, a metal alkylamide, a carbonyl metal compound, a metal aryl, a metal cyclopentadienyl, a phosphine, a metal phosphine, a metal hydride, or a mixture of any two or more thereof.

In some embodiments, the surface modification agent is an organometallic compound of Formula VIII, Formula IX, or a mixture thereof:
wherein
Formula VIII is M-(R⁸)$_p$;
Formula IX is M-(O—R⁹)$_p$;
wherein
M is a metal; and
R⁸ and R⁹ are each independently hydrogen, a halogen, an substituted or unsubstituted alkoxide group, a substituted or unsubstituted alkyl group, a substituted or unsubstituted aryl group, a substituted or unsubstituted aminealkyl group, and
p is an integer from 1 to 6.

In other embodiments, the surface modification agent is a compound selected from the group consisting of aluminum sec-butoxide, aluminum tribromide, aluminum trichloride, diethylaluminum ethoxide, tris(ethylmethylamido)aluminum, triethylaluminum, triisobutylaluminum, trimethylaluminum, tris(diethylamido)aluminum, tris(ethylmethylamido)aluminum, trimethylarsine, diborane, trimethylboron, bis(N,N'-diisopropylacetaminato)cobalt(II), dicarbonyl(cyclopentadienyl)cobalt (I), (N,N'-diisopropylacetaminato)copper(II), bis(N,N'-di-tert-butylacetamidinato)iron (II), gallium tribromide, gallium trichloride, triethylgallium, triisopropylgallium, trimethylgallium, tri(dimethylamido)gallium, tri-tert-butylgallium, digermane, germane, tetramethylgermanium, hafnium (IV) chloride, hafnium (IV) tert-butoxide, tetrakis(diethylamido)hafnium (IV), tetrakis(dimethylamido)hafnium (IV), tetrakis(ethylmethylamido)hafnium (IV), indium trichloride, indium(I) iodide, indium acetylacetonate, triethylindium, tris(N,N'-Di-tert-butylacetamidinato)lanthanum (III), bis(pentaethylcyclopentadienyl)magnesium, molybdenum hexacarbonyl, molybdenum (V) chloride, molybdenum (VI) fluoride, N,N-dimethylhydrazine, ammonia, azidotrimethylsilane, niobium (V) chloride, niobium (V) ethoxide, bis(methylcyclopentadienyl)nickel (II), phosphine, tert-butylphosphine, tris(trimethylsilyl)phosphine, cyclopentadienyl(trimethyl)platinum (IV), bis(ethylcyclopentadienyl)ruthenium (II), trimethylantimony, tris(dimethylamido)antimony, 2,4,6,8-tetramethylcyclotetrasiloxane, dimethoxydimethylsilane, disilane, methylsilane, octamethylcyclotetrasiloxane, silane, tris(isopropoxy)silanol, tris(tert-butoxy)silanol, tris(tert-pentoxy)silanol, pentakis(dimethylamido)tantalum (V), tantalum (V) chloride, tantalum (V) ethoxide, tris(diethylamino)(tert-butylimido)tantalum (V), bis(diethylamido)bis(dimethylamido)titanium (IV), tetrakis(diethylamido)titanium (IV), tetrakis(dimethylamido)titanium (IV), tetrakis(ethylmethylamido)titanium (IV), titanium (IV) bromide, titanium (IV) chloride, titanium (IV) tert-butoxide, vanadium (V) oxytriisopropoxide, bis(tert-butylimido)bis(dimethylamido)tungsten (VI), tungsten hexacarbonyl, tungsten (VI) chloride, tungsten (VI) fluoride, tris(N,N-bis(trimethylsilyl)amide)yttrium (III), yttrium (III)butoxide, diethylzinc, tetrakis(diethylamido)zirconium (IV), tetrakis(dimethylamido)zirconium (IV), tetrakis(ethylmethylamido)zirconium (IV), zirconium (IV) bromide, zirconium (IV) chloride, zirconium (IV) tert-butoxide, and a mixture of any two or more thereof.

In other embodiments, the surface modification agent is cyclic organic compound that can under ring opening coupling reaction with acidic groups like —OH; at least one of the chemical bonds in the cyclic organic compound is sensitive to acidic groups; when reacting with acidic group, the ring will be opened at the specific site and undergo coupling reaction with the surface acidic group without forming residue chemicals. An exemplary of such surface modification agent is, but not limited to, cyclic alkylene oxides and epoxy.

In other embodiments, the surface modification agent is a compound selected from the group consisting of ammonia, phosphine, a halophosphine, a alkylphosphine, a haloalkylphosphine, an alkylamine, and a mixture of any two or more thereof.

In some embodiments, the surface of the active material is alternately treated for 1 to 1000 times with a first and a second surface modification agents, where the first modification agent is selected from the group consisting of the organometallic compound of Formula VIII, Formula IX, aluminum sec-butoxide, aluminum tribromide, aluminum trichloride, diethylaluminum ethoxide, tris(ethylmethylamido)aluminum, triethylaluminum, triisobutylaluminum, trimethylaluminum, tris(diethylamido)aluminum, tris(ethylmethylamido)aluminum, trimethylarsine, diborane, trimethylboron, bis(N,N'-diisopropylacetaminato)cobalt(II), dicarbonyl(cyclopentadienyl)cobalt (I), (N,N'-diisopropylacetaminato)copper(II), bis(N,N'-di-tert-butylacetamidinato)iron (II), gallium tribromide, gallium trichloride, triethylgallium, triisopropylgallium, trimethylgallium, tri(dimethylamido)gallium, tri-tert-butylgallium, digermane, germane, tetramethylgermanium, hafnium (IV) chloride, hafnium (IV) tert-butoxide, tetrakis(diethylamido)hafnium (IV), tetrakis(dimethylamido)hafnium (IV), tetrakis(ethylmethylamido)hafnium (IV), indium trichloride, indium(I) iodide, indium acetylacetonate, triethylindium, tris(N,N'-Di-tert-butylacetamidinato)lanthanum (III), bis(pentaethylcyclopentadienyl)magnesium, molybdenum hexacarbonyl, molybdenum (V) chloride, molybdenum (VI) fluoride, N,N-dimethylhydrazine, ammonia, azidotrimethylsilane, niobium (V) chloride, niobium (V) ethoxide, bis(methylcyclopentadienyl)nickel (II), phosphine, tert-butylphosphine, tris(trimethylsilyl)phosphine, cyclopentadienyl(trimethyl)platinum (IV), bis(ethylcyclopentadienyl)ruthenium (II), trimethylantimony, tris(dimethylamido)antimony, 2,4,6,8-tetramethylcyclotetrasiloxane, dimethoxydimethylsilane, disilane, methylsilane, octamethylcyclotetrasiloxane, silane, tris(isopropoxy)silanol, tris(tert-butoxy)silanol, tris(tert-pentoxy)silanol, pentakis(dimethylamido)tantalum (V), tantalum (V) chloride, tantalum (V) ethoxide, tris(diethylamino)(tert-butylimido)tantalum (V), bis(diethylamido)bis(dimethylamido)titanium (IV), tetrakis(diethylamido)titanium (IV), tetrakis(dimethylamido)titanium (IV), tetrakis(ethylmethylamido)titanium (IV), titanium (IV) bromide, titanium (IV) chloride, titanium (IV) tert-butoxide, vanadium (V) oxytriisopropoxide, bis(tert-butylimido)bis(dimethylamido)tungsten (VI), tungsten hexacarbonyl, tungsten (VI) chloride, tungsten (VI) fluoride, tris(N,N-bis(trimethylsilyl)amide)yttrium (III), yttrium (III)butoxide, diethylzinc, tetrakis(diethylamido)zirconium (IV), tetrakis(dimethylamido)zirconium (IV), tetrakis(ethylmethylamido)zirconium (IV), zirconium (IV) bromide, zirconium (IV) chloride, zirconium (IV) tert-butoxide, and a mixture of any two or more thereof; and the second surface modification agent is selected from the group consisting of ammonia, phosphine, a halophosphine, a alkylphosphine, a haloalkylphosphine, an alkylamine, and a mixture of any two or more thereof.

In another aspect, an electrode of the above active materials having a surface modification agent are provided. In some embodiments, the electrode is a negative electrode. In other embodiments, the electrode is a positive electrode.

In another aspect, methods of modifying the surface of an electrode or electrode active material with a surface modification are provided. In some embodiments, the methods include modifying the surface of an electrode of a battery by providing a surface modification agent; and adding the surface modification agent to a non-aqueous electrolyte; wherein the battery comprises the electrode and the non-aqueous electrolyte. In some such embodiments, a concentration of the surface modification agent in the non-aqueous electrolyte is from about 0.00001 wt % to 10 wt %. In other embodiments, the concentration of the surface modification agent in the non-aqueous electrolyte is from about 0.0001 wt % to 3 wt %. In still other embodiments, the concentration of the surface modification agent in the non-aqueous electrolyte is from about 0.001 wt % to 2 wt %.

In other embodiments, the methods include modifying the surface of an electrode laminate by providing a gas phase surface modification agent or a solution of a surface modification agent; and exposing the surface modification agent to the electrode laminate; wherein the solution of the surface modification agent is prepared by dissolving or suspending the surface modification agent in a solvent. In some such embodiments, the time of the exposing step is from about 0.1 second to 24 hours. In other embodiments, the time of the exposing step is from about 1 second to 1 hour. In still other embodiments, the time of the exposing step is from about 1 second to 10 minutes.

In other embodiments, the methods include modifying the surface of an electrode active material by providing a solution or a suspension of a surface modification agent; providing the electrode active material; preparing a slurry of the surface modification agent, the electrode active material, a polymeric binder, and a conductive filler; casting the slurry in a metallic current collector; and drying the cast slurry. In some such embodiments, the drying step is carried out at a temperature between about 40° C. and 200° C. In other embodiments, the polymeric binder is PVDF, PVDF-HFP, or a mixture thereof. In other embodiments, the conductive filler is carbon black, carbon fiber, graphite, a metallic nano powder, or a mixture of any two or more thereof. In other embodiments, the concentration of the surface modification agent in the slurry is from about 0.00001 wt % to 5 wt %. In still other embodiments, the concentration of the surface modification agent in the slurry is from about 0.0001 wt % to 3 wt %. In still other embodiments, the concentration of the surface modification agent in the slurry is from about 0.001 wt % to 2 wt %.

In other embodiments, the methods include modifying the surface of an electrode active material by providing a gas phase surface modification agent or a solution of a surface modification agent; and exposing the surface modification agent to the electrode active material; wherein the electrode active material is in the form of a powder. In some such embodiments, the time of the exposing step is from about 0.1 second to 24 hours. In other embodiments, the method further includes providing steam or water in addition to the surface modification agent. In still other embodiments, the method further comprises exposing the surface modification agent and moisture, alternately, to the electrode laminate or the electrode active material a repeat number of times from 1 to 1000. In some embodiments, the repeat number of times is from 3 to 100. In other embodiments, the repeat number of times is from 5 to 20. In yet other embodiments, the exposing surface modification agent is performed by alternately exposing two or more surface modification agents.

In other embodiments, the methods include modifying the surface of an electrode active material by providing a gas surface modification agent; providing a radiofrequency discharge to create a plasma of the gas surface modification agent; and contacting the gas surface modification agent with the electrode active material. In some such embodiments, the gas surface modification agent is a fluorine-based gas $F_2$, $C_{q''}F_{2q''+2}$, $C_{q''}F_{2q''}$, or $C_{q''}F_{2q''-2}$ and q" is an integer ranging from 1 to 20. In some embodiments, the fluorine-based gas is $CF_4$. In other embodiments, a pressure of the gas surface modification agent is less than 10 Pa. In other embodiments, the gas surface modification agent is a mixture of $CF_4$ and an inert gas selected from nitrogen, helium, argon, or a mixture of any two or more thereof. In some embodiments, a concentration of $CF_4$ in the inert gas is less than about 20%.

In some embodiments, any of the above active materials is a positive electrode active material selected from the group consisting of spinel, olivine, carbon-coated olivine, $LiFePO_4$, $Li_xM'_y$, $M''_z{}'PO_4$, $Li_{1+x''}Ni_\alpha Mn_\beta Co_\gamma Met'_\delta O_{2-z''}F_{z'''}$, $A_{n''}B_2(XO_4)_3$, vanadium oxide, and mixtures of any two or more thereof; and further wherein M' is selected from the group consisting of V, Cr, Mg, Fe, Co, and Ni;

M" is selected from group consisting of IIA, IIIA, IVA, VA, VIA and IIIB metals having an ionic radius less than the ionic radius of $Fe^{2+}$;

Met' is selected from the group consisting of Mg, Zn, Al, Ga, B, Zr, and Ti; and $0 \le x' \le 1$, $0 \le y' \le 1$, $0 \le z' \le 1$, $0 \le x'' \le 0.4$, $0 \le \alpha \le 1$, $0 \le \beta \le 1$, $0 \le \gamma \le 2$, $0 \le \delta \le 0.2$, $0 \le z'' \le 0.5$, and $0 \le n'' \le 3$.

In some such embodiments, the positive electrode material is coated with $Al_2O_3$, $AlF_3$, $ZrO_2$, $SiO_2$, $MgO$, $TiO_2$, $CaO$, $SnO_2$, $WO_3$, $In_2O_3$, $Ga_2O_3$, $Sc_2O_3$, $Y_2O_3$, $La_2O_3$, $HfO_2$, $V_2O_5$, $Nb_2O_5$, $Ta_2O_5$, $MnO$, $MnO_2$, $CoO$, $Co_2O_3$, $NiO$, $NiO_2$, $CuO$, $ZnO$, $MgF_2$, $CaF_2$, Mo, Ta, W, Fe, Co, Cu, Ru, Pa, Pt, Al, Si, Se, oxyfluorides, or a mixture of two or more of thereof.

In some embodiments, any of the above active materials is a negative electrode material selected from the group consisting of graphite, amorphous carbon, $Li_4Ti_5O_{12}$, $M_{1-x}A_xLi_{2-y}B_yTi_{6-z}C_zO_{14-t}Q_t$, tin alloys, silicon alloys, intermetallic compounds, lithium metal, or mixtures of any two or more such materials; and further wherein:

M is selected from the group consisting of Ba, Sr, Ca, Mg, Pb, and Sn;

$0 \le x \le 0.5$, $0 \le y \le 0.5$, $0 \le z \le 0.5$, $0 \le t \le 0.5$;

each of A, B and C are independently at least one divalent, trivalent or tetravalent metal; and Q is a monovalent or divalent anion.

In some such embodiments, the negative electrode material is coated with $Al_2O_3$, $AlF_3$, $ZrO_2$, $SiO_2$, $MgO$, $TiO_2$, $CaO$, $SnO_2$, $WO_3$, $In_2O_3$, $Ga_2O_3$, $Sc_2O_3$, $Y_2O_3$, $La_2O_3$, $HfO_2$, $V_2O_5$, $Nb_2O_5$, $Ta_2O_5$, $MnO$, $MnO_2$, $CoO$, $Co_2O_3$, $NiO$, $NiO_2$, $CuO$, $ZnO$, $MgF_2$, $CaF_2$, Mo, Ta, W, Fe, Co, Cu, Ru, Pa, Pt, Al, Si, Se, oxyfluorides or a mixture of two or more of thereof.

In another aspect, an electrochemical device is provided having a positive electrode; a negative electrode; and a non-aqueous electrolyte; wherein the negative electrode and/or the positive electrode comprises a surface modification agent.

BRIEF DESCRIPTION OF THE DRAWINGS

FIG. 1 is a composite illustration of a composite photograph of battery cells without (A) and with (B) added surface modification agent. A fresh cell (C) after sealing, but before any electrochemical testing is conducted is also included.

DETAILED DESCRIPTION

Surface Modification Agents

In various aspects, surface modified active materials, surface modification agents and methods to of modifying materials that are used in lithium ion batteries, to suppress gas release from the batteries, are provided. Such surface modification agents include a class of compounds that may selectively react with acidic functional groups on the surface of a material used to manufacture battery electrodes, and to eliminate the chemical or electrochemical reactivity of such functional groups. While any electrode may be suitable for modification, in some embodiments, the electrode is an electrode laminate as are known to those of skill in the art. Such acidic functional groups include, but are not limited to, —OH and —COOH. As used herein, a "laminate" electrode is an electrode constructed from an electrode active material, a conductive filler, and a polymeric binder that maintains the physical integrity of the electrode.

In general, the surface modification agents are a group of compounds that can selectively react with surface functional groups on the active materials that form electrodes. In some embodiments, the surface modification agent is one or more silanes of the formulas represented as Formula I, II, III, IV, and V.

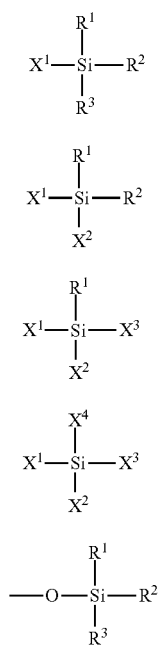

wherein $X^1$, $X^2$, $X^3$ and $X^4$ are independently —Cl, —Br or alkoxyl groups; $R^1$, $R^2$, and $R^3$ are independently a halogen, a substituted or unsubstituted alkyl group, a substituted or unsubstituted aryl group, an $OR^5$ group, or a group of Formula V; and $R^5$ is a substituted or unsubstituted alkyl group, or a substituted or unsubstituted aryl group. In some embodiments, the alkyl or aryl groups are substituted with one or more halogens. In some other embodiments, at least one of substitution group of $R^1$, $R^2$, or $R^3$ contains an ethylene oxide moiety as shown in Formula VI:

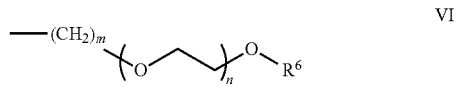

where, m is an integer from 0 to 10; n is an integer from 1 to 10; and $R^6$ is a substituted or unsubstituted alkyl group, a substituted or unsubstituted aryl group, or a carbonate-based sub group. In some embodiments, the alkyl or aryl groups are substituted with one or more halogens. Exemplary carbonate-based subgroups in those represented by Formula VII:

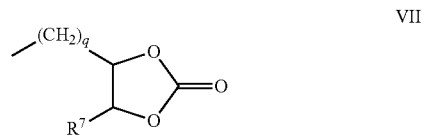

where $R^7$ is hydrogen, or a group selected from a substituted or unsubstituted alkyl group have from 1 to 12 carbon atoms, a substituted or unsubstituted alkenyl group having from 2 to 8 carbon atoms; and q is an integer from 0 to 8.

In other embodiments, the surface modification agent is an organometallic compound of Formula VIII or IX, where the compound of Formula VIII is M-$(R^8)_p$ and the compound of Formula IX is M-$(O$—$R^9)_{p'}$. In such other embodiments, M is a metal; each $R^8$ and $R^9$ are independently hydrogen, a halogen, an alkoxide group, a substituted or unsubstituted alkyl group, a substituted or unsubstituted aryl group, or an alkylamine group; and p is an integer from 1 to 6. In some embodiments, the alkyl or aryl groups are substituted with one or more halogens.

Suitable organometallic compounds of Formulas VIII and IX include, but are not limited to, metal alkoxides, metal halides, metal alkyls, metal alkylamides, carbonyl metal compounds, metal aryls, metal cyclopentadienides, phosphines, metal phosphines, metal hydrides, and the like. For example, some compounds of Formula VIII and IX include, but are not limited to aluminum sec-butoxide, aluminum tribromide, aluminum trichloride, diethylaluminum ethoxide, tris(ethylmethylamido)aluminum, triethylaluminum, triisobutylaluminum, trimethylaluminum, tris(diethylamido)aluminum, tris(ethylmethylamido)aluminum, trimethylarsine, diborane, trimethylboron, bis(N,N'-diisopropylacetaminato)cobalt(II), dicarbonyl(cyclopentadienyl)cobalt (I), (N,N'-diisopropylacetaminato)copper(II), bis(N,N'-di-tert-butylacetamidinato)iron (II), gallium tribromide, gallium trichloride, triethylgallium, triisopropylgallium, trimethylgallium, tri(dimethylamido)gallium, tri-tert-butylgallium, digermane, germane, tetramethylgermanium, hafnium (IV) chloride, hafnium (IV) tert-butoxide, tetrakis (diethylamido)hafnium (IV), tetrakis(dimethylamido)hafnium (IV), tetrakis(ethylmethylamido)hafnium (IV), indium trichloride, indium(I) iodide, indium acetylacetonate, triethylindium, tris(N,N'-Di-tert-butylacetamidinato)lanthanum (III), bis(pentaethylcyclopentadienyl)magnesium, molybdenum hexacarbonyl, molybdenum (V) chloride, molybdenum (VI) fluoride, N,N-dimethylhydrazine, ammonia, azidotrimethylsilane, niobium (V) chloride, niobium (V) ethoxide, bis(methylcyclopentadienyl)nickel (II), phosphine, tert-butylphosphine, tris(trimethylsilyl)phosphine, cyclopentadienyl(trimethyl)platinum (IV), bis(ethylcyclopentadienyl)ruthenium (II), trimethylantimony, tris(dimethylamido)antimony, 2,4,6,8-tetramethylcyclotetrasiloxane, dimethoxydimethylsilane, disilane, methylsilane, octamethylcyclotetrasiloxane, silane, tris(isopropoxy)silanol, tris(tert-butoxy)silanol, tris(tert-pentoxy)silanol, pentakis(dimethylamido)tantalum (V), tantalum (V) chloride, tantalum (V) ethoxide, tris(diethylamino)(tert-butylimido)tantalum (V), bis(diethylamido)bis(dimethylamido)titanium (IV), tetrakis(diethylamido)titanium (IV), tetrakis(dimethylamido)titanium (IV), tetrakis(ethylmethylamido)titanium (IV), titanium (IV) bromide, titanium (IV) chloride, titanium (IV) tert-butoxide, vanadium (V) oxytriisopropoxide, bis(tert-butylimido)bis(dimethylamido)tungsten (VI), tungsten hexacarbonyl, tungsten (VI) chloride, tungsten (VI) fluoride, tris(N,N-bis(trimethylsilyl)amide)yttrium (III), yttrium (III) butoxide, diethylzinc, tetrakis(diethylamido)zirconium (IV), tetrakis(dimethylamido)zirconium (IV), tetrakis(ethylmethylamido)zirconium (IV), zirconium (IV) bromide, zirconium (IV) chloride, zirconium (IV) tert-butoxide. In yet other embodiments, the surface modification agent is a compound such as ammonia, phosphine, a halophosphine, a alkylphosphine, a haloalkylphosphine, an alkylamine, or a mixture of any two or more such compounds.

Methods

In another aspect, methods of modifying the surface chemistry of active materials for a lithium, or lithium ion battery are provided. There are a number of methods in which the surface modification agent may be introduced to the electrode, or active materials from which the electrode is produced.

In such methods, surface modification agents may be introduced to a battery as an additive to non-aqueous electrolytes. In such embodiments, all the wettable surface area of an electrode by the electrolyte is exposed to the surface modification agent. Once exposed surface functional groups on the electrodes can be modified by reaction with the surface modification agent. By introducing the surface modification agents to the battery through the electrolyte, negative and positive electrodes may be modified simultaneously. In some embodiments, the concentration of the surface modification agent in the non-aqueous electrolyte is from about 0.00001 wt % to 10 wt %, from about 0.0001 wt % to 3 wt %, in other embodiments, or from about 0.001 wt % to 2 wt %, in yet other embodiments.

Alternatively, surface modification agents may be directly applied to the electrode by exposing the dry electrode to a gas phase, or dilute solution, of the inventive surface modification agent. After the exposure, the electrode may be heated to remove residual surface modification agent.

In another alternative, surface modification agents may be introduced directly into an electrode slurry from which an electrode may be produced. In such embodiments, the electrode slurry is a non-homogeneous mixture of an active positive or negative electrode material, a conductive filler, a polymeric binder, and a solvent. Such materials are typically mixed and cast into electrodes. During the mixing and casting process, the surface modification agents react with surface functional groups, such as —OH and —COOH, on the active material's surface. After casting, excess surface modification agent, and reaction byproducts are removed during the drying process, while the reacted agent is chemically bound to the surface of the electrode material, and is not removed by simple heat treatment. Suitable conductive fillers for use in the slurry and electrode include, but are not limited to materials such as carbon black, carbon fiber, graphite, or other metallic nanopowder materials. Suitable polymeric binders for use in the slurry and electrode include, but are not limited to polymers such as PVDF (polyvinylidene difluoride), or co-polymers of PVDF with other materials such as hexafluoropropylene (PVdF-HFP).

In yet another alternative, surface modification agents may be directly applied to an active electrode material powder or electrode laminate by exposing the powder or laminate to the gas phase, or diluted solution of the surface modification agent. In some other embodiments, the active material powder is treated with the surface modification agent and water or moisture to achieve multiple layer modification and to maximize coverage. Still in some other embodiments, the active material powder is treated with more than one inventive surface modification agents as well as water or moisture to introduce new functionalities and to maximize the coverage. In some embodiments, the exposure time of the surface modification agent to the active electrode material is from about 0.1 second to 24 hours, from about 1 second to 1 hour, in other embodiments, or from about 1 second to 10 minutes, in yet other embodiments.

In a further alternative, methods of surface modification of the above materials are provided and may be accomplished using a gas such as $F_2$, $C_{q''}F_{2q''+2}$, $C_{q''}F_{2q''}$, or $C_{q''}F_{2q''-2}$ where q" is an integer ranging from 1 to 20, in a reactor with a radiofrequency ($R_f$) discharge. For example, $CF_4$ is one such suitable gas. In general, in such methods, the gas is used to make a plasma which, when in contact with the active material, grafts fluorinated functionalities directly to the material's surface. In the case of $CF_4$, the $CF_4$ plasma grafts fluorine atoms to the active material's surface by a mechanism that involves $CF_q$-radical reactions at the surface as well, where q is from 1-4. As a general procedure, samples of an active material, such as $Li_4Ti_5O_{12}$, are placed in the center of a chamber where $R_f$ discharge occurs using $CF_4$ gas. The flow rate of the $CF_4$ may be widely varied, depending upon the surface modification desired, but is typically on the order of about 10 cm$^3$/min. The total gas pressure is typically be less than about 10 Pa. In some examples, the power may range from about 20 W to 300 W, but is typically about 80 W. The plasma frequency is typically 13.56 MHz. Temperature may also impact the surface modification and the temperature is typically less than about 150° C. The time of exposure of the material to the plasma is typically less than 2 hours. Substantial production of atomic fluorine after the dissociation $CF_4$ gas and improved radical production efficiency can be obtained by adjusting the flow rate of the gas, the gas pressure, the temperature of the sample, and the time of exposure of the material to the plasma.

In other embodiments, the surface modification can be carried out by surface fluorination where the material can be put in fluorine reactor and either fluorine gas or a mixture of fluorine gas and an inert gas is introduced to the reactor to react with acidic groups at the surface of the active material. Inert gases may include helium, nitrogen, argon, and other such gases known to those of skill in the art. The temperature of the reactor should not exceed 120° C. to prevent the decomposition of the electrode material. In the situation where only fluorine gas is used, the temperature of the reactor is typically less than 40° C., and the time of fluorination is less than about 60 min. In the situation where the fluorination of the active material's surface is carried out using a mixture of fluorine gas and an inert gas such nitrogen, argon, or other such inert gases, the concentration of fluorine gas in the mixture is less than about 20%, and the temperature is less than about 120° C. The fluorination could be static using a close reactor, or could be in a form of flowing the gas through the reactor.

In any of the above methods, the active material may be repeatedly contacted with the surface modification agent, until the desired level of modification is achieved. For example, after the first modification of the active material, subsequent modifications may be iteratively made on the material recovered from the previous iteration. For example, the surface modification agent may be exposed to the electrode laminate or the electrode active material a repeat number of times ranging from 1 to 1000, or more. In some embodiments, the repeat number of times, or iterations, is from 3 to 100. In other embodiments, the repeat number of times, or iterations, is from 5 to 20.

In another aspect, and as described above, lithium batteries may be prepared using the surface modification agents. Typically, the batteries include a positive electrode, a negative electrode, and a non-aqueous electrolyte, and either one or both of the positive or negative electrode has been modified with a surface modification agent. The anode and the cathode in lithium batteries are typically separated from each other by a porous separator.

Suitable negative electrodes for lithium batteries include those having graphite, amorphous carbon, $Li_4Ti_5O_{12}$, $M_{1-x}A_xLi_{2-y}B_yTi_{6-z}C_zO_{14-t}Q_t$, tin alloys, silicon alloys, intermetallic compounds, lithium metal, or mixtures of any two or more such materials. In such materials, M is selected from Ba, Sr, Ca, Mg, Pb, Sn and other divalent cations; $0 \leq x \leq 0.5$, $0 \leq y \leq 0.5$, $0 \leq z \leq 0.5$, $0 \leq t \leq 0.5$; each of A, B and C are independently at least one divalent, trivalent or tetravalent metal; and Q is a monovalent or divalent anion. Suitable graphitic materials include natural graphite, artificial graphite, graphitized mesocarbon microbeads, and graphite fibers, as well as other amorphous carbon materials. The negative electrode, or the material used to prepare the negative electrode may additionally be coated with a material such as $Al_2O_3$, $AlF_3$, $ZrO_2$, $SiO_2$, MgO, $TiO_2$, CaO, $SnO_2$, $WO_3$, $In_2O_3$, $Ga_2O_3$, $Sc_2O_3$, $Y_2O_3$, $La_2O_3$, $HfO_2$, $V_2O_5$, $Nb_2O_5$, $Ta_2O_5$, MnO, $MnO_2$, CoO, $Co_2O_3$, NiO, $NiO_2$, CuO, ZnO, $MgF_2$, $CaF_2$, Mo, Ta, W, Fe, Co, Cu, Ru, Pa, Pt, Al, Si, Se, oxyfluorides, or a mixture of two or more of thereof.

Suitable positive electrodes for lithium batteries include those having spinel, olivine, carbon-coated olivine, $LiFePO_4$, $Li_{x'}M'_{y'}M''_{z''}PO_4$, $Li_{1+x''}Ni_\alpha Mn_\beta Co_\gamma Met'_\delta O_{2-z''}F_{z'''}$, $A_{n''}B_2(XO_4)_3$ (Nasicon), vanadium oxide, or mixtures of any two or more such materials. In such materials, M' is selected from V, Cr, Mg, Fe, Co, or Ni; and M'' is selected from group IIA, IIIA, IVA, VA, VIA and IIIB metals having an ionic radius less than the ionic radius of $Fe^{2+}$. In such materials, Met' is selected from Mg, Zn, Al, Ga, B, Zr, or Ti; $0 \leq x' \leq 1$, $0 \leq y' \leq 1$, $0 \leq z' \leq 1$, $0 \leq x'' \leq 0.4$, $0 \leq \alpha \leq 1$, $0 \leq \beta \leq 1$, $0 \leq \gamma \leq 2$, $0 \leq \delta \leq 0.2$, $0 \leq z'' \leq 0.5$, and $0 \leq n'' \leq 3$. The positive electrode, or the material used to prepare the positive electrode may additionally be coated with a material such as $Al_2O_3$, $AlF_3$, $ZrO_2$, $SiO_2$, MgO, $TiO_2$, CaO, $SnO_2$, $WO_3$, $In_2O_3$, $Ga_2O_3$, $Sc_2O_3$, $Y_2O_3$, $La_2O_3$, $HfO_2$, $V_2O_5$, $Nb_2O_5$, $Ta_2O_5$, MnO, $MnO_2$, CoO, $Co_2O_3$, NiO, $NiO_2$, CuO, ZnO, $MgF_2$, $CaF_2$, Mo, Ta, W, Fe, Co, Cu, Ru, Pa, Pt, Al, Si, Se, oxyfluorides, or a mixture of two or more of thereof.

Suitable non-aqueous electrolytes include an alkali metal salt dissolved in a polar aprotic solvent. The alkali metal salt is typically present at a concentration of from about 0.5 to about 2 molar and is typically a lithium salt. Exemplary lithium salts include $LiCF_3CO_2$, $LiC_2F_5CO_2$, $LiClO_4$, $LiBF_4$, $LiAsF_6$, $LiPF_6$, $LiPF_2(C_2O_4)_2$, $LiPF_4(C_2O_4)$, $LiCF_3SO_3$, $LiN(CF_3SO_2)_2$, $LiC(CF_3SO_2)_3$, $LiN(SO_2C_2F_5)_2$), lithium alkyl fluorophosphates, lithium bis(oxalato) borate (LiBOB), $LiBF_2(C_2O_4)$, $Li_2B_{12}X_{12-n}H_n$, $Li_2B_{10}X_{10-n'}H_{n'}$, and a mixture of any two or more such materials, where X is selected from OH, $OCH_3$, F, Cl, Br, or I, n is an integer from 0 to 12, and n' is an integer from 0 to 10.

In some embodiments, the non-aqueous electrolytes include and electrode stabilizing additive to protect the electrodes from degradation. See e.g., co-pending U.S. application Ser. Nos. 10/857,365, 11/279,120, and provisional application No. 60/647,361. Thus, electrolytes of the invention can include an electrode stabilizing additive that can be reduced or polymerized on the surface of a negative electrode to form a passivation film on the surface of the negative electrode. Likewise, inventive electrolytes can include an electrode stabilizing additive that can be oxidized or polymerized on the surface of the positive electrode to form a passivation film on the surface of the positive electrode. In some embodiments, electrolytes of the invention further include mixtures of the two types of electrode stabilizing additives. The additives are typically present at a concentration of about 0.001 to 8 wt %.

In some embodiments, an electrode stabilizing additive is a substituted or unsubstituted linear, branched or cyclic hydrocarbon comprising at least one oxygen atom and at least one aryl, alkenyl or alkynyl group. The passivating film formed from such electrode stabilizing additives may also be formed from a substituted aryl compound or a substituted or unsubstituted heteroaryl compound where the additive comprises at least one oxygen atom. Alternatively, a combination of two additives may be used. In some such embodiments, one additive is selective for forming a passivating film on the cathode to prevent leaching of metal ions and the other additive can be selective for passivating the anode surface to prevent or lessen the reduction of metal ions at the anode.

Representative electrode stabilizing additives include 1,2-divinyl furoate, 1,3-butadiene carbonate, 1-vinylazetidin-2-one, 1-vinylaziridin-2-one, 1-vinylpiperidin-2-one, 1 vinylpyrrolidin-2-one, 2,4-divinyl-1,3-dioxane, 2 amino-3 vinylcyclohexanone, 2-amino-3-vinylcyclopropanone, 2 amino-4-vinylcyclobutanone, 2-amino-5-vinylcyclopentanone, 2-aryloxy-cyclopropanone, 2-vinyl-[1,2]oxazetidine, 2 vinylaminocyclohexanol, 2-vinylaminocyclopropanone, 2 vinyloxetane, 2-vinyloxy-cyclopropanone, 3-(N-vinylamino)cyclohexanone, 3,5-divinyl furoate, 3-vinylazetidin-2-one, 3 vinylaziridin 2 one, 3 vinylcyclobutanone, 3 vinylcyclopentanone, 3 vinyloxaziridine, 3 vinyloxetane, 3-vinylpyrrolidin-2-one, 4,4 divinyl-3 dioxolan 2-one, 4 vinyltetrahydropyran, 5-vinylpiperidin-3-one, allylglycidyl ether, butadiene monoxide, butyl vinyl ether, dihydropyran-3-one, divinyl butyl carbonate, divinyl carbonate, divinyl crotonate, divinyl ether, divinyl ethylene carbonate, divinyl ethylene silicate, divinyl ethylene sulfate, divinyl ethylene sulfite, divinyl methoxypyrazine, divinyl methylphosphate, divinyl propylene carbonate, ethyl phosphate, methoxy-o-terphenyl, methyl phosphate, oxetan-2-yl-vinylamine, oxiranylvinylamine, vinyl carbonate, vinyl crotonate, vinyl cyclopentanone, vinyl ethyl-2-furoate, vinyl ethylene carbonate, vinyl ethylene silicate, vinyl ethylene sulfate, vinyl ethylene sulfite, vinyl methacrylate, vinyl phosphate, vinyl-2-furoate, vinylcylopropanone, vinylethylene oxide, β-vinyl-γ-butyrolactone, or a mixture of any two or more thereof. In some embodiments the electrode stabilizing additive may be a cyclotriphosphazene that is substituted with F, alkyloxy, alkenyloxy, aryloxy, methoxy, allyloxy groups, or combinations thereof. For example, the additive may be a (divinyl)-(methoxy)(trifluoro)cyclotriphosphazene, (trivinyl)(difluoro)(methoxy)cyclotriphosphazene, (vinyl)(methoxy)(tetrafluoro)cyclotriphosphazene, (aryloxy)(tetrafluoro)(methoxy)-cyclotriphosphazene, (diaryloxy)(trifluoro)(methoxy) cyclotriphosphazene compounds, or a mixture of two or more such compounds. In some embodiments, the electrode stabilizing additive is vinyl ethylene carbonate, vinyl carbonate, or 1,2-diphenyl ether, or a mixture of any two or more such compounds.

Other representative electrode stabilizing additives may include compounds with phenyl, naphthyl, anthracenyl, pyrrolyl, oxazolyl, furanyl, indolyl, carbazolyl, imidazolyl, or thiophenyl groups. For example, electrode stabilizing additives may be aryloxpyrrole, aryloxy ethylene sulfate, aryloxy pyrazine, aryloxy-carbazole trivinylphosphate, aryloxy-ethyl-2-furoate, aryloxy-o-terphenyl, aryloxy-pyridazine, butyl-aryloxy-ether, divinyl diphenyl ether, (tetrahydro-furan-2-yl)-vinylamine, divinyl methoxybipyridine, methoxy-4-vinylbiphenyl, vinyl methoxy carbazole, vinyl methoxy piperidine, vinyl methoxypyrazine, vinyl methyl carbonate-allylanisole, vinyl pyridazine, 1-divinylimidazole, 3-vinyltetrahydrofuran, divinyl furan, divinyl methoxy furan, divinylpyrazine, vinyl methoxy imidazole, vinylmethoxy pyrrole, vinyl-tetrahydrofuran, 2,4-divinyl isooxazole, 3,4 divinyl-1-methyl pyrrole, aryloxyoxetane, aryloxy-phenyl carbonate, aryloxy-piperidine, aryloxy-tetrahydrofuran, 2-aryl-cyclopropanone, 2-diaryloxy-furoate, 4-allylanisole, aryloxy-carbazole, aryloxy-2-furoate, aryloxy-crotonate, aryloxy-cyclobutane, aryloxy-cyclopentanone, aryloxy-cyclopropanone, aryloxy-cycolophosphazene, aryloxy-ethylene silicate, aryloxy-ethylene sulfate, aryloxy-ethylene sulfite, aryloxy-imidazole, aryloxy-methacrylate, aryloxy-phosphate, aryloxy-pyrrole, aryloxy-quinoline, diaryloxy-cyclotriphosphazene, diaryloxy ethylene carbonate, diaryloxy furan, diaryloxy methyl phosphate, diaryloxy-butyl carbonate, diaryloxy-crotonate, diaryloxy-diphenyl ether, diaryloxy-ethyl silicate, diaryloxy-ethylene silicate, diaryloxy-ethylene sulfate, diaryloxyethylene sulfite, diaryloxy-phenyl carbonate, diaryloxy-propylene carbonate, diphenyl carbonate, diphenyl diaryloxy silicate, diphenyl divinyl silicate, diphenyl ether, diphenyl silicate, divinyl methoxydiphenyl ether, divinyl phenyl carbonate, methoxycarbazole, or 2,4-dimethyl-6-hydroxy-pyrimidine, vinyl methoxyquinoline, pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, vinyl carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o terphenyl, N-methyl pyrrole, naphthalene, or a mixture of any two or more such compounds.

In other embodiments, electrode stabilizing additives include substituted or unsubstituted spirocyclic hydrocarbons containing at least one oxygen atom and at least one alkenyl or alkynyl group. For example, such stabilizing additives include those having Formula X:

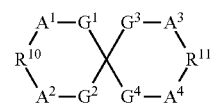

X wherein $A^1$, $A^2$, $A^3$, and $A^4$ are independently O or $CR^{12}R^{13}$; provided that $A^1$ is not O when $G^1$ is O, $A^2$ is not O when $G^2$ is O, $A^3$ is not O when $G^3$ is O, and $A^4$ is not O when $G^4$ is O; $G^1$, $G^2$, $G^3$, and $G^4$ are independently O or $CR^{12}R^{13}$; provided that $G^1$ is not O when $A^1$ is O, $G^2$ is not O when $A^2$ is O, $G^3$ is not O when $A^3$ is O, and $G^4$ is not O when $A^4$ is O; $R^{10}$ and $R^{11}$ are independently a substituted or unsubstituted divalent alkenyl or alkynyl group; and $R^{12}$ and $R^{13}$ at each occurrence are independently H, F, Cl, or a substituted or an unsubstituted alkyl, alkenyl, or alkynyl group.

Representative examples of Formula X include, but are not limited to, 3,9 divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9 diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5] undecane, 3,9-divinyl-1,5,7,11-tetraoxaspiro[5.5]undecane, 3,9 dimethylene-1,5,7,11-tetraoxaspiro[5.5]undecane, 3,9 diethylidene-1,5,7,11-tetraoxaspiro[5.5]undecane, or a mixture of any two or more such compounds. Furthermore, mixtures of any two or more electrode stabilizing additives may also be used in the electrolytes of the present invention.

In some embodiments, the electrode stabilizing additive is an anion receptor. In some embodiments, the anion receptor is a Lewis acid. In other embodiments, the anion receptor is a borane, a boronate, a borate, a borole, or a mixture of any two or more such compounds.

In some embodiments, the anion receptor is a compound of the Formula XI:

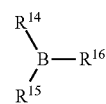

XI where, each $R^{14}$, $R^{15}$, and $R^{16}$ are independently halogen, alkyl, aryl, halogen-substituted alkyl, halogen-substituted aryl, or $OR^{17}$; or any two of $R^{14}$, $R^{15}$, $R^{16}$ and $R^{17}$, together with the atoms to which they are attached, form a heterocyclic ring having 5-9 members, and $R^{17}$ is at each occurrence independently alkyl, aryl, halogen-substituted alkyl, or halogen-substituted aryl. In some such embodiments, $R^{14}$, $R^{15}$, and $R^{16}$ are independently halogen, alkyl, aryl, halogen-substituted alkyl, or halogen-substituted aryl; or any two of $R^{14}$, $R^{15}$, and $R^{16}$, together with the boron to which they are attached, form a heterocyclic ring having 5-9 members.

In some embodiments, the anion receptors include, but not limited to, tri(propyl)borate, tris(1,1,1,3,3,3-hexafluoro-propan-2-yl)borate, tris(1,1,1,3,3,3-hexafluoro-2-phenyl-propan-2-yl)borate, tris(1,1,1,3,3,3-hexafluoro-2-(trifluoromethyl)propan-2-yl)borate, triphenyl borate, tris(4-fluorophenyl)borate, tris(2,4-difluorophenyl)borate, tris(2,3,5,6-tetrafluorophenyl)borate, tris(pentafluorophenyl)borate, tris(3-(trifluoromethyl)phenyl)borate, tris(3,5-bis(trifluoromethyl)phenyl)borate, tris(pentafluorophenyl)borane, or a mixture of any two or more thereof. Further suitable additives include 2-(2,4-difluorophenyl)-4-fluoro-1,3,2-benzodioxaborole, 2-(3-trifluoromethyl phenyl)-4-fluoro-1,3,2-benzodioxaborole, 2,5-bis(trifluoromethyl)phenyl-4-fluoro-1,3,2-benzodioxaborole, 2-(4-fluorophenyl)-tetrafluoro-1,3,2-benzodioxaborole, 2-(2,4-difluorophenyl)-tetrafluoro-1,3,2-benzodioxaborole, 2-(pentafluorophenyl)-tetrafluoro-1,3,2-benzodioxaborole, 2-(2-trifluoromethyl phenyl)-tetrafluoro-1,3,2-benzodioxaborole, 2,5-bis(trifluoromethyl phenyl)-tetrafluoro-1,3,2-benzodioxaborole, 2-phenyl-4,4,5,5-tetra(trifluoromethyl)-1,3,2-benzodioxaborolane, 2-(3,5-difluorophenyl-4,4,5,5-tetrakis(trifluoromethyl)-1,3,2-di-oxaborolane, 2-(3,5-difluorophenyl-4,4,5,5-tetrakis(trifluoromethyl)-1,3,2-dioxaborolane, 2-pentafluorophenyl-4,4,5,5-tetrakis(trifluoromethyl)-1,3,2-dioxaborolane, bis(1,1,1,3,3,3-hexafluoroisopropyl)phenyl-boronate, bis(1,1,1,3,3,3-hexafluoroisopropyl)-3,5-difluoro-phenylboronate, bis(1,1,1,3,3,3-hexafluoroisopropyl) pentafluorophenylboronate, or a mixture of any two or more such compounds.

In some embodiments, each anion receptor is present at a concentration of about 0.001 to about 10 wt %.

Lithium (chelato)borates such as $Li[B(C_2O_4)_2]$ and $Li(C_2O_4)BF_2$, or lithium (chelato)phosphates such as $LiPF_2(C_2O_4)$ may be used as the alkali metal salt, or as an electrode stabilizing additive, in some embodiments. As such, the alkali metal salt may be other than $Li[B(C_2O_4)_2]$, $Li[BF_2(C_2O_4)]$, $Li[PF_4(C_2O_4)]$ or $Li[PF_2(C_2O_4)_2]$; and the electrolyte may include, as a electrode stabilizing additive, $Li[B(C_2O_4)_2]$, $Li[BF_2(C_2O_4)]$, $Li[PF_4(C_2O_4)]$, $Li[PF_2(C_2O_4)_2]$, or a mixture of two or more such materials. Such electrode stabilizing materials may be present from about 0.001 to about 8 wt %. In some other embodiments, the lithium salt is other than $Li_2B_{12}X_{12-n}H_n$, or $Li_2B_{10}X_{10-n}H_n$; and the electrolyte includes as a electrolyte additive, $Li_2B_{12}X_{12-n}H_n$, $Li_2B_{10}X_{10-n}H_n$, or a mixture of two or more of such compounds. Such electrolyte additives may be present from about 0.001 to 15 wt %. In such compounds, X is OH, OCH$_3$, F, Cl, Br, or I, n is an integer from 0 to 12, and n' is an integer from 0 to 10.

In some embodiments, the electrode stabilizing additive is any of the above electrode stabilizing additives, or a mixture of any two or more such additives.

Suitable polar aprotic solvents for use in the non-aqueous electrolytes include but not limited to, for example, siloxane, polysiloxane, ethyl acetate, propyl acetate, ethylene carbonate, propylene carbonate, dimethyl carbonate, diethyl carbonate, ethyl methyl carbonate, dimethyl ether, diethyl ether, methyl acetate, gamma-butyrolactone, sulfolane, or a mixture of any two or more thereof. Protic solvents such as water and alcohols cannot be used with the present invention.

In some embodiments, the inventive electrolyte is a gel electrolyte comprising: at least one aprotic solvent; at least one lithium salt; at least one crosslinking agent; at least one monofunctional monomeric compound; and at least one radical reaction initiator. In some embodiments, the gel electrolyte can also comprise other electrode stabilization additives and other electrolyte additives.

In some embodiments, suitable crosslinking agents may be represented by Formula XII:

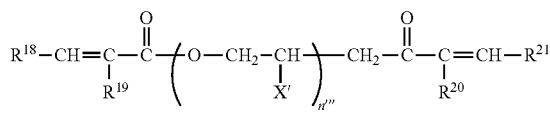

where $R^{18}$, $R^{19}$, $R^{20}$, and $R^{21}$ are each independently hydrogen, a substituted or unsubstituted alkyl group having from 1 to 12 carbon atoms, or a substituted or unsubstituted alkenyl group having from 2 to 12 carbon atoms; and where X' is a hydrogen, methyl, or ethyl group, and n''' is an integer from 1 to 15.

Monofunctional monomeric compounds may be used for the control of the crosslinking density of the gel electrolyte. Suitable monofunctional monomeric compounds include those of Formula XIII:

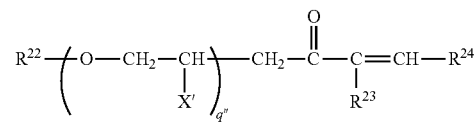

where $R^{22}$ is an alkyl group having from 1 to 12 carbon atoms; $R^{23}$ and $R^{24}$ are each independently a hydrogen, a substituted or unsubstituted alkyl group having from 1 to 12 carbon atoms, or a substituted or unsubstituted alkenyl group having from 2 to 12 carbon atoms; X' is hydrogen, methyl or ethyl group; and q'' is an integer from 1 to 20.

Crosslinking agents and monofunctional monomeric compounds provide a physical framework, or gel, after crosslinking to host the liquid phase. Variation of the amount of the crosslinking agent and monofunctional monomeric compound in the gel may impact the conductivity of the gel electrolyte, due to changes in viscosity. Lower viscosity gels are prepared with higher concentrations of monofunctional monomeric compound, as compared to the concentration of monofunctional monomeric compound used for higher viscosity gels. Without being bound by theory, higher viscosity gels may be expected to have lower electrochemical conductivity, while lower viscosity gels may be expected to have higher electrochemical conductivity. However, other electrochemical properties of the gel electrolyte, or an electrochemical cell prepared with the gel electrolyte, such as oxidation potential and reduction potential, are not expected to be impacted.

Polymerization of crosslinking agents and monofunctional monomeric compounds are known to those of skill in the art. For example, monofunctional monomeric compounds may be polymerized by thermal and photo initiation. Representative thermal initiators include, but are not limited to, an azo compound, a peroxide compound, bismaleimide, or a mixture of any two or more thereof. One example of an azo compound is azoisobutyronitrile. One example of a peroxide compound is benzoylperoxide. Representative photo initiators include, but are not limited to, 1-hydroxyl-phenyl-ketone, benzophenone, 2-hydroxyl-2-methyl-1-phenyl-propanone, 2-hydroxyl-1-[4-(2-hydroxyl)phenyl]-2-methyl-1-propanone, methylbenzoylformate, oxy-phenyl-acetic acid 2-[2-oxo-2-phenyl-acetoxy-ethoxy]-ethyl ester, oxy-phenyl-acetic 2-[2-hydroxy-ethoxy]-ethyl ester, α,α-dimethoxy-α-phenylacetophenone, 2-benzyl-2-(dimethyl-amino)-1-[4-(4-morpholinyl)phenyl]-1-propanone, diphenyl (2,4,6-trimethylthio)phenyl)-phosphine oxide, phosphine oxide, phenyl bis(2,4,6-trimethyl benzoyl), bis($\eta^5$-2,4-cyclopentadien-1-yl) bis[2,6-difluoro-3-(1H-pyrrol-1-yl)phenyl]titanium, iodonium (4-methylphenyl)-[4-(2-methylpropyl)phenyl]-hexafluorophosphate, or a mixture of two or more thereof. In some instances the photoinitiator is a UV initiator.

Non-aqueous electrolytes may further include redox shuttles to provide overcharge protection of the lithium battery. See US Patent Application Nos. 2007/0178370; 2007/0072085; 2006/0199080; 2005/0227143; 2005/0221196; 2005/0221168. Redox shuttle additives, capable of being oxidized or reduced in the non-aqueous electrolyte. In some embodiments, the redox shuttle additive is a substituted or unsubstituted ferrocene compound, such as those described in U.S. Pat. No. 4,857,423, or a substituted aromatic compound. The substituted aromatic compounds suitable for use in the present invention may generally be of formula XIV:

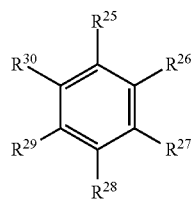

XIV where each of $R^{25}$, $R^{26}$, $R^{27}$, $R^{28}$, $R^{29}$ and $R^{30}$ of Formula XIV are independently selected from H, —F, —Cl, —Br, —I, haloalkyl, cycloalkyl, alkyl, alkenyl, aryl, heteroaryl, —CN, or —$NO_2$, —O-alkyl, —O-aryl, —O-heteroaryl, —O-alkenyl, —O-alkynyl, —S-alkyl, —S-aryl, —S-alkenyl, —S-alkynyl, —S-heteroaryl, and the groups:

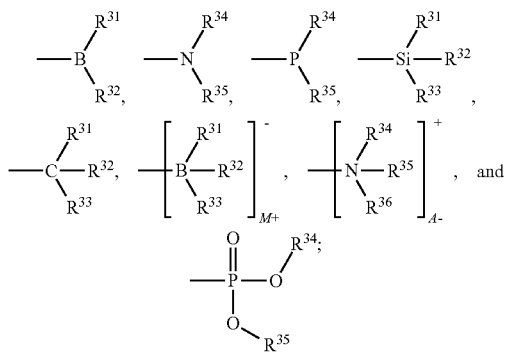

or any two adjacent groups of $R^{25}$, $R^{26}$, $R^{27}$, $R^{28}$, $R^{29}$ and $R^{30}$ together may form a fused ary or heteroaryl ring; and where each $R^{31}$, $R^{32}$ and $R^{33}$ may independently be a hydrogen, halogen, an alkyl group, an aryl group, a halogen substituted alkyl group, or a halogen substituted aryl group; and where each $R^{34}$, $R^{35}$ and $R^{36}$ may independently be a halogen atom, an alkyl group, an aryl group, a halogen substituted alkyl group, or a halogen substituted aryl group; where $M^+$ is a cation, $A^-$ is an anion, and where at least one of $R^{25}$, $R^{26}$, $R^{27}$, $R^{28}$, $R^{29}$ and $R^{30}$ is not H. Also, two or more of $R^{25}$, $R^{29}$ and $R^{30}$ may each independently be an —O-alkyl, —O-alkenyl, —O-alkynyl, —O-aryl, or —O-heteroaryl group. In some embodiments, $R^{25}$ is H. In other embodiments, the redox shuttle additive may be 2,5-di-(tert-butyl)-1,4-dimethoxybenzene, (tetrafluorobenzo-1,2-dioxyl)-pentafluorophenyl-borane, or a mixture of any two or more such compounds. In another embodiment, the redox shuttle additive is a borate or heteroborate cluster ion, e.g., $Li_2B_{10}X_{10}$ or $Li_2B_{12}X_{12}$ where each X is independently H, F, Cl, Br, I, $OCH_3$, or OH. Suitable borate and heteroborate salts include $Li_2B_{10}Cl_{10}$, $Li_2B_{10}OH_qCl_{q'}$, $Li_2B_{10}H_2Cl_8$, $Li_2B_{10}Cl_8(OH)_2$, $Li_2B_{10}Br_{10}$, $Li_2B_{12}Cl_{12}$, and those described in U.S. Patent Publication No. 2005/0227143, where q is an integer from 3 to 5 and q' is an integer from 5 to 9 and the sum of q and q' is 10. The redox shuttle additives may be a mixture of any two or more of the materials identified above as redox shuttle additives.

Definitions

The following terms are used throughout as defined below.

For the purposes of this disclosure and unless otherwise specified, "a" or "an" means "one or more."

The inventions illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally the phrase "consisting essentially of" will be understood to include those elements specifically recited and those additional elements that do not materially affect the basic and novel characteristics of the claimed invention. The phrase "consisting of" excludes any element not specifically specified.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

In general, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; ethers; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

Alkyl groups include straight chain and branched alkyl groups having from 1 to about 20 carbon atoms, and typically from 1 to 12 carbons or, in some embodiments, from 1 to 8, 1 to 6, or 1 to 4 carbon atoms. Alkyl groups further include cycloalkyl groups as defined below. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups can be substituted one or more times with substituents such as those listed above.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 3 to 6, or 3 to 7. Cycloalkyl groups further include mono-, bicyclic and polycyclic ring systems, such as, for example bridged cycloalkyl groups as described below, and fused rings, such as, but not limited to, decalinyl, and the like. In some embodiments, polycyclic cycloalkyl groups have three rings. Substituted cycloalkyl groups can be substituted one or more times with, non-hydrogen and non-carbon groups as defined above. However, substituted cycloalkyl groups also include rings that are substituted with straight or branched chain alkyl groups as defined above. Representative substituted cycloalkyl groups can be mono-substituted or substituted more than once, such as, but not limited to, 2,2-, 2,3-, 2,4-2,5- or 2,6-disubstituted cyclohexyl groups, which can be substituted with substituents such as those listed above. Cycloalkyl groups can also be bridged cycloalkyl groups in which two or more hydrogen atoms are replaced by an alkylene bridge, wherein the bridge can contain 2 to 6 carbon atoms if two hydrogen atoms are located on the same carbon atom, or 1 to 5 carbon atoms, if the two hydrogen atoms are located on adjacent carbon atoms, or 2 to 4 carbon atoms if the two hydrogen atoms are located on carbon atoms separated by 1 or 2 carbon atoms. Bridged cycloalkyl groups can be bicyclic, such as, for example bicyclo[2.1.1]hexane, or tricyclic, such as, for example, adamantyl. Representative bridged cycloalkyl groups include bicyclo[2.1.1]hexyl, bicyclo[2.2.1]heptyl, bicyclo[3.2.1]octyl, bicyclo[2.2.2]octyl, bicyclo[3.2.2] nonyl, bicyclo[3.3.1]nonyl, bicyclo[3.3.2]decanyl, adamantyl, noradamantyl, bornyl, or norbornyl groups. Substituted bridged cycloalkyl groups can be substituted one or more times with non-hydrogen and non-carbon groups as defined above. Representative substituted bridged cycloalkyl groups can be mono-substituted or substituted more than once, such as, but not limited to, mono-, di- or tri-substituted adamantyl groups, which can be substituted with substituents such as those listed above.

Cycloalkylalkyl groups are alkyl groups as defined above in which a hydrogen or carbon bond of an alkyl group is replaced with a bond to a cycloalkyl group as defined above. In some embodiments, cycloalkylalkyl groups have from 4 to 20 carbon atoms, 4 to 16 carbon atoms, and typically 4 to 10 carbon atoms. Substituted cycloalkylalkyl groups can be substituted at the alkyl, the cycloalkyl or both the alkyl and cycloalkyl portions of the group. Representative substituted cycloalkylalkyl groups can be mono-substituted or substituted more than once, such as, but not limited to, mono-, di- or tri-substituted with substituents such as those listed above.

Alkenyl groups include straight and branched chain and cycloalkyl groups as defined above, except that at least one double bond exists between two carbon atoms. Thus, alkenyl groups have from 2 to about 20 carbon atoms, and typically from 2 to 12 carbons or, in some embodiments, from 2 to 8, 2 to 6, or 2 to 4 carbon atoms. In some embodiments, alkenyl groups include cycloalkenyl groups having from 4 to 20 carbon atoms, 5 to 20 carbon atoms, 5 to 10 carbon atoms, or even 5, 6, 7, or 8 carbon atoms. Examples include, but are not limited to vinyl, allyl, —CH=CH(CH$_3$), —CH=C (CH$_3$)$_2$, —C(CH$_3$)=CH$_2$, —C(CH$_3$)=CH(CH$_3$), CH=CHCH=CH$_2$, C(CH$_2$CH$_3$)=CH$_2$, cyclohexenyl, cyclopentenyl, cyclohexadienyl, butadienyl, pentadienyl, and hexadienyl, among others. Representative substituted alkenyl groups can be mono-substituted or substituted more than once, such as, but not limited to, mono-, di- or tri-substituted with substituents such as those listed above.

Cycloalkenylalkyl groups are alkyl groups as defined above in which a hydrogen or carbon bond of the alkyl group is replaced with a bond to a cycloalkenyl group as defined above. Substituted cycloalkylalkenyl groups can be substituted at the alkyl, the cycloalkenyl or both the alkyl and cycloalkenyl portions of the group. Representative substituted cycloalkenylalkyl groups can be substituted one or more times with substituents such as those listed above.

Alkynyl groups include straight and branched chain alkyl groups, except that at least one triple bond exists between two carbon atoms. Thus, alkynyl groups have from 2 to about 20 carbon atoms, and typically from 2 to 12 carbons or, in some embodiments, from 2 to 8, 2 to 6, or 2 to 4 carbon atoms. Examples include, but are not limited to —C≡CH, —C≡C(CH$_3$), —C≡C(CH$_2$CH$_3$), —CH$_2$C≡CH, —CH$_2$CC(CH$_3$), and —CH$_2$CC(CH$_2$CH$_3$), among others. Representative substituted alkynyl groups can be mono-substituted or substituted more than once, such as, but not limited to, mono-, di- or tri-substituted with substituents such as those listed above.

Aryl groups are cyclic aromatic hydrocarbons that do not contain heteroatoms. Aryl groups include monocyclic, bicyclic and polycyclic ring systems. Thus, aryl groups include, but are not limited to, cyclopentadienyl, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 5-14 carbons, and in others from 5 to 12 or even 6-10 carbon atoms in the ring portions of the groups. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Representative substituted aryl groups can be mono-substituted or substituted more than once. For example, monosubstituted aryl groups include, but are not limited to, 2-, 3-, 4-, 5-, or 6-substituted phenyl or naphthyl groups, which can be substituted with substituents such as those listed above.

Aralkyl groups are alkyl groups as defined above in which a hydrogen or carbon bond of an alkyl group is replaced with a bond to an aryl group as defined above. In some embodiments, aralkyl groups contain 7 to 20 carbon atoms, 7 to 14 carbon atoms or 7 to 10 carbon atoms. Substituted aralkyl groups can be substituted at the alkyl, the aryl or both the alkyl and aryl portions of the group. Representative aralkyl groups include but are not limited to benzyl and phenethyl groups and fused (cycloalkylaryl)alkyl groups such as 4-ethyl-indanyl. Representative substituted aralkyl groups can be substituted one or more times with substituents such as those listed above.

Heterocyclyl groups include aromatic (also referred to as heteroaryl) and non-aromatic ring compounds containing 3 or more ring members, of which one or more is a heteroatom such as, but not limited to, N, O, and S. In some embodiments, heterocyclyl groups include 3 to 20 ring members, whereas other such groups have 3 to 6, 3 to 10, 3 to 12, or 3 to 15 ring members. Heterocyclyl groups encompass unsaturated, partially saturated and saturated ring systems, such as, for example, imidazolyl, imidazolinyl and imidazolidinyl groups. The phrase "heterocyclyl group" includes fused ring species including those comprising fused aromatic and non-aromatic groups, such as, for example, benzotriazolyl, 2,3-dihydrobenzo[1,4]dioxinyl, and benzo[1,3]dioxolyl. The phrase also includes bridged polycyclic ring systems containing a heteroatom such as, but not limited to, quinuclidyl. However, the phrase does not include heterocyclyl groups that have other groups, such as alkyl, oxo or halo groups, bonded to one of the ring members. Rather, these are referred to as "substituted heterocyclyl groups". Heterocyclyl groups include, but are not limited to, aziridinyl, azetidinyl, pyrrolidinyl, imidazolidinyl, pyrazolidinyl, thiazolidinyl, tetrahydrothiophenyl, tetrahydrofuranyl, dioxolyl, furanyl, thiophenyl, pyrrolyl, pyrrolinyl, imidazolyl, imidazolinyl, pyrazolyl, pyrazolinyl, triazolyl, tetrazolyl, oxazolyl, isoxazolyl, thiazolyl, thiazolinyl, isothiazolyl, thiadiazolyl, oxadiazolyl, piperidyl, piperazinyl, morpholinyl, thiomorpholinyl, tetrahydropyranyl, tetrahydrothiopyranyl, oxathiane, dioxyl, dithianyl, pyranyl, pyridyl, pyrimidinyl, pyridazinyl, pyrazinyl, triazinyl, dihydropyridyl, dihydrodithiinyl, dihydrodithionyl, homopiperazinyl, quinuclidyl, indolyl, indolinyl, isoindolyl, azaindolyl (pyrrolopyridyl), indazolyl, indolizinyl, benzotriazolyl, benzimidazolyl, benzofuranyl, benzothiophenyl, benzthiazolyl, benzoxadiazolyl, benzoxazinyl, benzodithiinyl, benzoxathiinyl, benzothiazinyl, benzoxazolyl, benzothiazolyl, benzothiadiazolyl, benzo[1,3]dioxolyl, pyrazolopyridyl, imidazopyridyl (azabenzimidazolyl), triazolopyridyl, isoxazolopyridyl, purinyl, xanthinyl, adeninyl, guaninyl, quinolinyl, isoquinolinyl, quinolizinyl, quinoxalinyl, quinazolinyl, cinnolinyl, phthalazinyl, naphthyridinyl, pteridinyl, thianaphthalenyl, dihydrobenzothiazinyl, dihydrobenzofuranyl, dihydroindolyl, dihydrobenzodioxinyl, tetrahydroindolyl, tetrahydroindazolyl, tetrahydrobenzimidazolyl, tetrahydrobenzotriazolyl, tetrahydropyrrolopyridyl, tetrahydropyrazolopyridyl, tetrahydroimidazopyridyl, tetrahydrotriazolopyridyl, and tetrahydroquinolinyl groups. Representative substituted heterocyclyl groups can be mono-substituted or substituted more than once, such as, but not limited to, pyridyl or morpholinyl groups, which are 2-, 3-, 4-, 5-, or 6-substituted, or disubstituted with various substituents such as those listed above.

Heteroaryl groups are aromatic ring compounds containing 5 or more ring members, of which, one or more is a heteroatom such as, but not limited to, N, O, and S. Heteroaryl groups include, but are not limited to, groups such as pyrrolyl, pyrazolyl, triazolyl, tetrazolyl, oxazolyl, isoxazolyl, thiazolyl, pyridyl, pyridazinyl, pyrimidinyl, pyrazinyl, thiophenyl, benzothiophenyl, furanyl, benzofuranyl, indolyl, azaindolyl (pyrrolopyridyl), indazolyl, benzimidazolyl, imidazopyridyl (azabenzimidazolyl), pyrazolopyridyl, triazolopyridyl, benzotriazolyl, benzoxazolyl, benzothiazolyl, benzothiadiazolyl, imidazopyridyl, isoxazolopyridyl, thianaphthalenyl, purinyl, xanthinyl, adeninyl, guaninyl, quinolinyl, isoquinolinyl, tetrahydroquinolinyl, quinoxalinyl, and quinazolinyl groups. Although the phrase "heteroaryl groups" includes fused ring compounds such as indolyl and 2,3-dihydro indolyl, the phrase does not include heteroaryl groups that have other groups bonded to one of the ring members, such as alkyl groups. Rather, heteroaryl groups with such substitution are referred to as "substituted heteroaryl groups." Representative substituted heteroaryl groups can be substituted one or more times with various substituents such as those listed above.

Heterocyclylalkyl groups are alkyl groups as defined above in which a hydrogen or carbon bond of an alkyl group is replaced with a bond to a heterocyclyl group as defined above. Substituted heterocyclylalkyl groups can be substituted at the alkyl, the heterocyclyl or both the alkyl and heterocyclyl portions of the group. Representative heterocyclyl alkyl groups include, but are not limited to, 4-ethyl-morpholinyl, 4-propylmorpholinyl, furan-2-yl methyl, furan-3-yl methyl, pyridine-3-yl methyl, tetrahydrofuran-2-yl ethyl, and indol-2-yl propyl. Representative substituted heterocyclylalkyl groups can be substituted one or more times with substituents such as those listed above.

Heteroaralkyl groups are alkyl groups as defined above in which a hydrogen or carbon bond of an alkyl group is replaced with a bond to a heteroaryl group as defined above. Substituted heteroaralkyl groups can be substituted at the alkyl, the heteroaryl or both the alkyl and heteroaryl portions of the group. Representative substituted heteroaralkyl groups can be substituted one or more times with substituents such as those listed above.

Alkoxy groups are hydroxyl groups (—OH) in which the bond to the hydrogen atom is replaced by a bond to a carbon atom of a substituted or unsubstituted alkyl group as defined above. Examples of linear alkoxy groups include but are not limited to methoxy, ethoxy, propoxy, butoxy, pentoxy, hexoxy, and the like. Examples of branched alkoxy groups include but are not limited to isopropoxy, sec-butoxy, tert-butoxy, isopentoxy, isohexoxy, and the like. Examples of cycloalkoxy groups include but are not limited to cyclopropyloxy, cyclobutyloxy, cyclopentyloxy, cyclohexyloxy, and the like. Representative substituted alkoxy groups can be substituted one or more times with substituents such as those listed above.

The terms "aryloxy" and "arylalkoxy" refer to, respectively, a substituted or unsubstituted aryl group bonded to an oxygen atom and a substituted or unsubstituted aralkyl group bonded to the oxygen atom at the alkyl. Examples include but are not limited to phenoxy, naphthyloxy, and benzyloxy. Representative substituted aryloxy and arylalkoxy groups can be substituted one or more times with substituents such as those listed above.

The term "amide" (or "amido") includes C- and N-amide groups, i.e., —C(O)NR$^{37}$R$^{38}$, and —NR$^{37}$C(O)R$^{38}$ groups, respectively. The term "amine" (or "amino") as used herein refers to —NHR$^{37}$ and —NR$^{37}$R$^{38}$ groups. R$^{37}$ and R$^{38}$ are at each occurrence independently H, substituted or unsubstituted C$_{1-8}$ alkyl, substituted or unsubstituted C$_{1-8}$ alkenyl, substituted or unsubstituted C$_{1-8}$ alkynyl, substituted or unsubstituted aryl, substituted or unsubstituted aralkyl, substituted or unsubstituted heterocyclyl, substituted or unsubstituted heterocyclylalkyl, substituted or unsubstituted cycloalkyl, and substituted or unsubstituted cycloalkylalkyl as defined herein. In some embodiments, the amine is NH$_2$, methylamino, dimethylamino, ethylamino, diethylamino, propylamino, isopropylamino, phenylamino, or benzylamino.

One skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present invention, thus generally described, will be understood more readily by reference to the following examples, which are provided by way of illustration and are not intended to be limiting of the present invention.

EXAMPLES

Example 1

After the formation cycle, a 200 mAh $Li_4Ti_5O_{12}/Li_{1+x}Mn_{2-x}O_4$ lithium-ion cell exhibited slight swelling, indicating a small amount of gas was generated during the formation cycle. By contrast, a $Li_4Ti_5O_{12}/Li_{1+x}Mn_{2-x}O_4$ lithium-ion cell including 1 wt % chloro[2-[2-(2-methoxyethoxy)ethoxy]ethoxy]dimethylsilane failed to show any observable amount of gas when tested under the same conditions as the cell without the silane.

Example 2

FIG. 1 is a composite illustration of a composite photograph of cells before (C) and after (A,B) charging. Each cell is a $Li_4Ti_5O_{12}/Li_{1+x}Mn_{2-x}O_4$ lithium-ion cell. Cell (A) was prepared with 1 wt % chloro[2-[2-(2-methoxyethoxy)ethoxy]ethoxy]dimethylsilane as a surface modification agent, and cell (B) did not contain any surface modification agent. Cell (C) did not undergo any charging. Cells (A) and (B) were aged at 100% state of charge at 55° C. for 26 days prior to the photographs being taken. Plastic bags 110 were used to prevent shorting, and gas collecting pouches 120 were used to monitor the amount of gas generated. As evidenced by the swelling of the pouch 132, the cell without surface modification agent (A) generated much more gas than was generated in the cell with the surface modification agent (B) 131. The pouch of cell C did not exhibit any swelling 130.

What is claimed is:

1. An active material for an electrochemical device: wherein:
a surface of the active material is modified by a first surface modification agent selected from the group consisting of aluminum sec-butoxide, diethylaluminum ethoxide, tris(ethylmethylamido)aluminum, triethylaluminum, triisobutylaluminum, trimethylaluminum, tris(diethylamido)aluminum, tris(ethylmethylamido)aluminum, trimethylarsine, diborane, trimethylboron, bis(N,N'-diisopropylacetaminato)cobalt (II), dicarbonyl(cyclopentadienyl)cobalt (I), (N,N'-diisopropylacetaminato)copper (II), bis(N,N'-di-tert-butylacetamidinato)iron (II), triethylgallium, triisopropylgallium, trimethylgallium, tri(dimethylamido)gallium, tri-tert-butylgallium, digermane, germane, tetramethylgermanium, hafnium (IV) tert-butoxide, tetrakis(diethylamido)hafnium (IV), tetrakis(dimethylamido)hafnium (IV), tetrakis(ethylmethylamido)hafnium (IV), indium acetylacetonate, triethylindium, tris(N,N'-Di-tert-butylacetamidinato)lanthanum (III), bis(pentaethylcyclopentadienyl)magnesium, molybdenum hexacarbonyl, niobium (V) ethoxide, bis(methylcyclopentadienyl)nickel (II), cyclopentadienyl(trimethyl)platinum (IV), bis(ethylcyclopentadienyl)ruthenium (II), trimethylantimony, tris(dimethylamido)antimony, pentakis(dimethylamido)tantalum (V), tantalum (V) ethoxide, tris(diethylamino)(tert-butylimido)tantalum (V), bis(diethylamido)bis(dimethylamido)titanium (IV), tetrakis(diethylamido)titanium (IV), tetrakis(dimethylamido)titanium (IV), tetrakis(ethylmethylamido)titanium (IV), titanium (IV) tert-butoxide, vanadium (V) oxytriisopropoxide, bis(tert-butylimido)bis(dimethylamido)tungsten (VI), tungsten hexacarbonyl, tris(N,N-bis(trimethylsilyl)amide)yttrium (III), yttrium (III) butoxide, diethylzinc, tetrakis(diethylamido)zirconium (IV), tetrakis(dimethylamido)zirconium (IV), tetrakis(ethylmethylamido)zirconium (IV), zirconium (IV) tert-butoxide, and a mixture of any two or more thereof.

2. The active material of claim 1, wherein the surface active agent further comprises a second surface modification agent selected from the group consisting of: aluminum sec-butoxide, aluminum tribromide, aluminum trichloride, diethylaluminum ethoxide, tris(ethylmethylamido)aluminum, triethylaluminum, triisobutylaluminum, trimethylaluminum, tris(diethylamido)aluminum, tris(ethylmethylamido)aluminum, trimethylarsine, diborane, trimethylboron, bis(N,N'-diisopropylacetaminato)cobalt (II), dicarbonyl(cyclopentadienyl)cobalt (I), (N,N'-diisopropylacetaminato)copper (II), bis(N,N'-di-tert-butylacetamidinato)iron (II), gallium tribromide, gallium trichloride, triethylgallium, triisopropylgallium, trimethylgallium, tri(dimethylamido)gallium, tri-tert-butylgallium, digermane, germane, tetramethylgermanium, hafnium (IV) chloride, hafnium (IV) tert-butoxide, tetrakis(diethylamido)hafnium (IV), tetrakis(dimethylamido)hafnium (IV), tetrakis(ethylmethylamido)hafnium (IV), indium trichloride, indium(I) iodide, indium acetylacetonate, triethylindium, tris(N,N'-Di-tert-butylacetamidinato)lanthanum (III), bis(pentaethylcyclopentadienyl)magnesium, molybdenum hexacarbonyl, molybdenum (V) chloride, molybdenum (VI) fluoride, N,N-dimethylhydrazine, ammonia, azidotrimethylsilane, niobium (V) chloride, niobium (V) ethoxide, bis(methylcyclopentadienyl)nickel (II), phosphine, tert-butylphosphine, tris(trimethylsilyl)phosphine, cyclopentadienyl(trimethyl)platinum (IV), bis(ethylcyclopentadienyl)ruthenium (II), trimethylantimony, tris(dimethylamido)antimony, 2,4,6,8-tetramethylcyclotetrasiloxane, dimethoxydimethylsilane, disilane, methylsilane, octamethylcyclotetrasiloxane, silane, tris(isopropoxy)silanol, tris(tert-butoxy)silanol, tris(tert-pentoxy)silanol, pentakis(dimethylamido)tantalum (V), tantalum (V) chloride, tantalum (V) ethoxide, tris(diethylamino)(tert-butylimido)tantalum (V), bis(diethylamido)bis(dimethylamido)titanium (IV), tetrakis(diethylamido)titanium (IV), tetrakis(dimethylamido)titanium (IV), tetrakis(ethylmethylamido)titanium (IV), titanium (IV) bromide, titanium (IV) chloride, titanium (IV) tert-butoxide, vanadium (V) oxytriisopropoxide, bis(tert-butylimido)bis(dimethylamido)tungsten (VI), tungsten hexacarbonyl, tungsten (VI) chloride, tris(N,N-bis(trimethylsilyl)amide)yttrium (III), yttrium (III) butoxide, diethylzinc, tetrakis(diethylamido)zirconium (IV), tetrakis(dimethylamido)zirconium (IV), tetrakis(ethylmethylamido)zirconium (IV), zirconium (IV) bromide, zirconium (IV) chloride, zirconium (IV) tert-butoxide, and a mixture of any two or more thereof.

3. The active material of claim 1, wherein the surface active agent further comprises a second surface modification agent selected from the group consisting of ammonia, phosphine, a halophosphine, a alkylphosphine, a haloalkylphosphine, an alkylamine, moisture, and a mixture of any two or more thereof.

4. An electrode comprising an active material for an electrochemical device, a current collector, and a binder; wherein:
a surface of the active material is modified by a first surface modification agent selected from the group consisting of aluminum sec-butoxide, diethylaluminum ethoxide, tris(ethylmethylamido)aluminum, triethylaluminum, triisobutylaluminum, trimethylaluminum, tris(diethylamido)aluminum, tris(ethylmethylamido)aluminum, trimethylarsine, diborane, trimethylboron, bis(N,N'-diisopropylacetaminato)cobalt (II), dicarbonyl(cyclopentadienyl)cobalt (I), (N,N'-diisopropylacetaminato)copper (II), bis(N,N'-di-tert-butylacetamidinato)iron (II), triethylgallium, triisopropylgallium, trimethylgallium, tri(dimethylamido)gallium, tri-tert-butylgallium, digermane, germane, tetramethylgermanium, hafnium (IV) tert-butoxide, tetrakis(diethylamido)hafnium (IV), tetrakis(dimethylamido)hafnium (IV), tetrakis(ethylmethylamido)hafnium (IV), indium acetylacetonate, triethylindium, tris(N,N'-Di-tert-butylacetamidinato)lanthanum (III), bis(pentaethylcyclopentadienyl)magnesium, molybdenum hexacarbonyl, niobium (V) ethoxide, bis(methylcyclopentadienyl)nickel (II), cyclopentadienyl(trimethyl)platinum (IV), bis(ethylcyclopentadienyl)ruthenium (II), trimethylantimony, tris(dimethylamido)antimony, pentakis(dimethylamido)tantalum (V), tantalum (V) ethoxide, tris(diethylamino)(tert-butylimido)tantalum (V), bis(diethylamido)bis(dimethylamido)titanium (IV), tetrakis(diethylamido)titanium (IV), tetrakis(dimethylamido)titanium (IV), tetrakis(ethylmethylamido)titanium (IV), titanium (IV) tert-butoxide, vanadium (V) oxytriisopropoxide, bis(tert-butylimido)bis(dimethylamido)tungsten (VI), tungsten hexacarbonyl, tris(N,N-bis(trimethylsilyl)amide)yttrium (III), yttrium (III) butoxide, diethylzinc, tetrakis(diethylamido)zirconium (IV), tetrakis(dimethylamido)zirconium (IV), tetrakis(ethylmethylamido)zirconium (IV), zirconium (IV) tert-butoxide, and a mixture of any two or more thereof.

5. The electrode of claim 4, wherein the surface active agent further comprises a second surface modification agent selected from the group consisting of: aluminum sec-butoxide, aluminum tribromide, aluminum trichloride, diethylaluminum ethoxide, tris(ethylmethylamido)aluminum, triethylaluminum, triisobutylaluminum, trimethylaluminum, tris(diethylamido)aluminum, tris(ethylmethylamido)aluminum, trimethylarsine, diborane, trimethylboron, bis(N,N'-diisopropylacetaminato)cobalt (II), dicarbonyl(cyclopentadienyl)cobalt (I), (N,N'-diisopropylacetaminato)copper (II), bis(N,N'-di-tert-butylacetamidinato)iron (II), gallium tribromide, gallium trichloride, triethylgallium, triisopropylgallium, trimethylgallium, tri(dimethylamido)gallium, tri-tert-butylgallium, digermane, germane, tetramethylgermanium, hafnium (IV) chloride, hafnium (IV) tert-butoxide, tetrakis(diethylamido)hafnium (IV), tetrakis(dimethylamido)hafnium (IV), tetrakis(ethylmethylamido)hafnium (IV), indium trichloride, indium(I) iodide, indium acetylacetonate, triethylindium, tris(N,N'-Di-tert-butylacetamidinato)lanthanum (III), bis(pentaethylcyclopentadienyl)magnesium, molybdenum hexacarbonyl, molybdenum (V) chloride, molybdenum (VI) fluoride, N,N-dimethylhydrazine, ammonia, azidotrimethylsilane, niobium (V) chloride, niobium (V) ethoxide, bis(methylcyclopentadienyl)nickel (II), phosphine, tert-butylphosphine, tris(trimethylsilyl)phosphine, cyclopentadienyl(trimethyl)platinum (IV), bis(ethylcyclopentadienyl)ruthenium (II), trimethylantimony, tris(dimethylamido)antimony, 2,4,6,8-tetramethylcyclotetrasiloxane, dimethoxydimethylsilane, disilane, methylsilane, octamethylcyclotetrasiloxane, silane, tris(isopropoxy)silanol, tris(tert-butoxy)silanol, tris(tert-pentoxy)silanol, pentakis(dimethylamido)tantalum (V), tantalum (V) chloride, tantalum (V) ethoxide, tris(diethylamino)(tert-butylimido)tantalum (V), bis(diethylamido)bis(dimethylamido)titanium (IV), tetrakis(diethylamido)titanium (IV), tetrakis(dimethylamido)titanium (IV), tetrakis(ethylmethylamido)titanium (IV), titanium (IV) bromide, titanium (IV) chloride, titanium (IV) tert-butoxide, vanadium (V) oxytriisopropoxide, bis(tert-butylimido)bis(dimethylamido)tungsten (VI), tungsten hexacarbonyl, tungsten (VI) chloride, tris(N,N-bis(trimethylsilyl)amide)yttrium (III), yttrium (III) butoxide, diethylzinc, tetrakis(diethylamido)zirconium (IV), tetrakis(dimethylamido)zirconium (IV), tetrakis(ethylmethylamido)zirconium (IV), zirconium (IV) bromide, zirconium (IV) chloride, zirconium (IV) tert-butoxide, and a mixture of any two or more thereof.

6. The electrode of claim 4, wherein the surface active agent further comprises a second surface modification agent selected from the group consisting of ammonia, phosphine, a halophosphine, a alkylphosphine, a haloalkylphosphine, an alkylamine, moisture, and a mixture of any two or more thereof.

7. The electrode of claim 4, wherein the binder is polyvinylidene difluoride, copolymer of polyvinylidene difluoride and hexafluoropropylene, or a mixture thereof.

8. The electrode of claim 4 further comprising a conductive filling selected from the group consisting of carbon black, carbon fiber, graphite, a metallic nano powder, and a mixture of any two or more thereof.

9. The electrode of claim 4 which is a negative electrode.
10. The electrode of claim 4 which is a positive electrode.
11. An active material for an electrochemical device:
wherein:
a surface of the active material is modified by a first surface modification agent and a second surface modification agent;
the first surface modification agent is a compound of Formula VIII, Formula IX, or a mixture thereof,
Formula VIII is $M\text{-}(R^8)_p$;
Formula IX is $M\text{-}(O\text{---}R^9)_p$;
M is a metal;
$R^8$ and $R^9$ are each independently hydrogen, alkoxy, alkyl, aryl, or aminoalkyl; and
p is an integer from 1 to 6; and
the second surface modification agent selected from the group consisting of: aluminum sec-butoxide, aluminum tribromide, aluminum trichloride, diethylaluminum ethoxide, tris(ethylmethylamido)aluminum, triethylaluminum, triisobutylaluminum, trimethylaluminum, tris(diethylamido)aluminum, tris(ethylmethylamido)aluminum, trimethylarsine, diborane, trimethylboron, bis(N,N'-diisopropylacetaminato)cobalt (II), dicarbonyl(cyclopentadienyl)cobalt (I), (N,N'-diisopropylacetaminato)copper (II), bis(N,N'-di-tert-butylacetamidinato)iron (II), gallium tribromide, gallium trichloride, triethylgallium, triisopropylgallium, trimethylgallium, tri(dimethylamido)gallium, tri-tert-butylgallium, digermane, germane, tetramethylgermanium, hafnium (IV) chloride, hafnium (IV) tert-butoxide, tetrakis(diethylamido)hafnium (IV), tetrakis(dimethylamido)hafnium (IV), tetrakis(ethylmethylamido)hafnium (IV), indium trichloride, indium(I) iodide, indium acetylacetonate, triethylindium, tris(N,N'-Di-tert-butylacetamidinato)lanthanum (III), bis(pentaethylcyclopentadienyl)magnesium, molybdenum hexacarbonyl, molybdenum (V) chloride, molybdenum (VI) fluoride, N,N-dimethylhydrazine, ammonia, azidotrimethylsilane, niobium (V) chloride, niobium (V) ethoxide, bis(methylcyclopentadienyl)nickel (II), phosphine, tert-butylphosphine, tris(trimethylsilyl)phosphine, cyclopentadienyl(trimethyl)platinum (IV), bis(ethylcyclopentadienyl)ruthenium (II), trimethylantimony, tris(dimethylamido)antimony, 2,4,6,8-tetramethylcyclotetrasiloxane, dimethoxydimethylsilane, disilane, methylsilane, octamethylcyclotetrasiloxane, silane, tris(isopropoxy)silanol, tris(tert-butoxy)silanol, tris(tert-pentoxy)silanol, pentakis(dimethylamido)tantalum (V), tantalum (V) chloride, tantalum (V) ethoxide, tris(diethylamino)(tert-butylimido)tantalum (V), bis(diethylamido)bis(dimethylamido)titanium (IV), tetrakis(diethylamido)titanium (IV), tetrakis(dimethylamido)titanium (IV), tetrakis(ethylmethylamido)titanium (IV), titanium (IV) bromide, titanium (IV) chloride, titanium (IV) tert-butoxide, vanadium (V) oxytriisopropoxide, bis(tert-butylimido)bis(dimethylamido)tungsten (VI), tungsten hexacarbonyl, tungsten (VI) chloride, tris(N,N-bis(trimethylsilyl)amide)yttrium (III), yttrium (III) butoxide, diethylzinc, tetrakis(diethylamido)zirconium (IV), tetrakis(dimethylamido)zirconium (IV), tetrakis(ethylmethylamido)zirconium (IV), zirconium (IV) bromide, zirconium (IV) chloride, zirconium (IV) tert-butoxide, and a mixture of any two or more thereof.

* * * * *